United States Patent [19] [11] 4,202,776
Joh [45] * May 13, 1980

[54] HOLLOW-FIBER PERMEABILITY APPARATUS

[75] Inventor: Yasushi Joh, Yokohama, Japan

[73] Assignee: Nippon Zeon Co., Ltd., Tokyo, Japan

[ * ] Notice: The portion of the term of this patent subsequent to Nov. 7, 1995, has been disclaimed.

[21] Appl. No.: 872,883

[22] Filed: Jan. 27, 1978

Related U.S. Application Data

[62] Division of Ser. No. 707,513, Jul. 22, 1976, Pat. No. 4,124,510.

[30] Foreign Application Priority Data

Jul. 28, 1975 [JP] Japan ................................... 50-91716
Jul. 30, 1976 [JP] Japan ................................... 51-92902

[51] Int. Cl.² ............................................. B01D 31/00
[52] U.S. Cl. .................................. 210/321 B; 210/456
[58] Field of Search ...................... 210/22, 321 B, 456

[56] References Cited

U.S. PATENT DOCUMENTS

| 3,397,141 | 8/1968 | Hakai | 210/321 A X |
| 3,540,595 | 11/1970 | Edwards | 210/321 B |
| 3,728,256 | 4/1973 | Cooper | 210/456 X |
| 3,778,369 | 12/1973 | Markley | 210/456 X |
| 4,075,100 | 2/1978 | Furuta et al. | 210/456 X |
| 4,082,670 | 4/1978 | Joh | 210/321 B |
| 4,124,510 | 11/1978 | Joh | 210/456 X |

Primary Examiner—Frank A. Spear, Jr.
Attorney, Agent, or Firm—McDougall, Hersh & Scott

[57] ABSTRACT

A hollow-fiber permeability apparatus includes: a housing; a bundle of permeable-wall hollow fibers disposed in the housing; inlet means for supplying a first fluid into the spaces between the fibers; outlet means for withdrawing the first fluid from the housing, the first fluid being led through at least one of the inlet and outlet means in a lamelliform flow toward the bundle, whereby the first fluid can uniformly flow through the whole bundle; and means for flowing a second fluid inside the fibers such that materials selectively permeate through the walls of the fibers.

7 Claims, 41 Drawing Figures

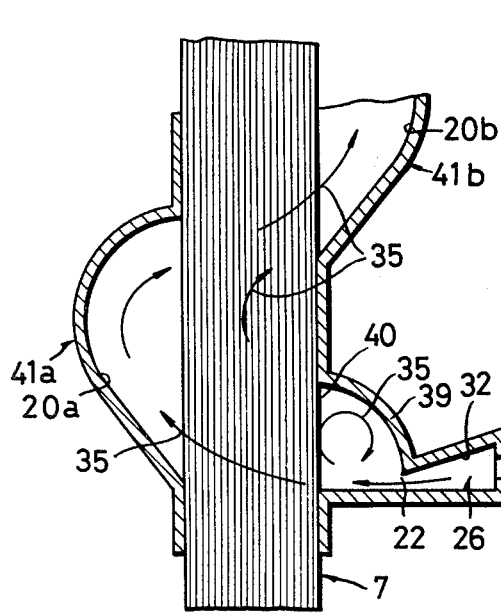
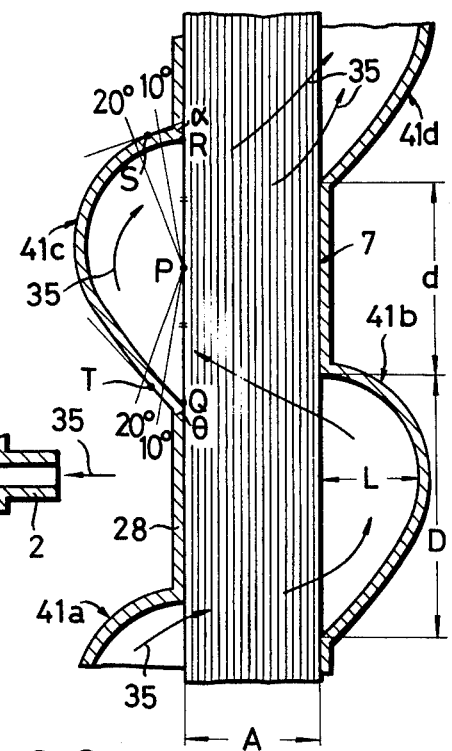
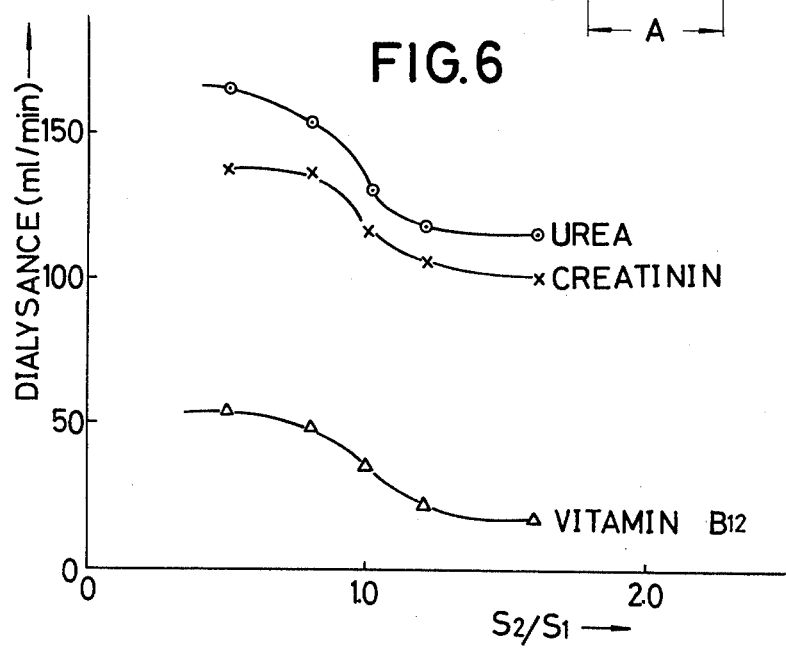

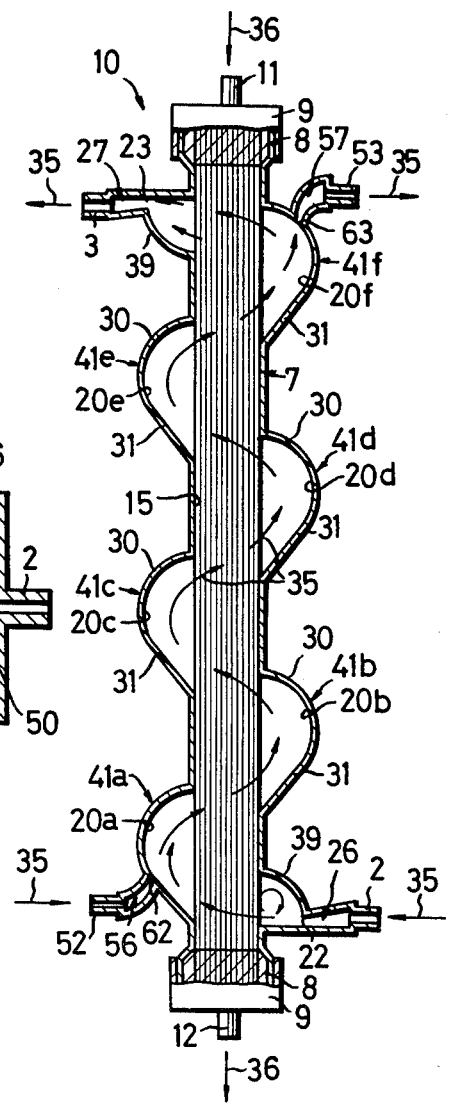

HOLLOW-FIBER PERMEABILITY APPARATUS

This is a division of application Ser. No. 707,513, filed July 22, 1976, now U.S. Pat. No. 4,124,510.

BACKGROUND OF THE INVENTION

1. Field of the Invention

This invention relates generally to a hollow-fibre permeability apparatus, and more particularly to hollow fibre permeability apparatus in which a permeating region of a housing contains a bundle of hollow fibres, and materials can selectively permeate through the membranes formed by the permeable walls of the hollow fibres, between a fluid flowing in the open spaces of the bundle of hollow fibres, and another fluid flowing inside the hollow fibres. The permeation may be based on the principles of osmosis, dialysis, ultrafiltration, reverse osmosis or the like.

2. Description of the Prior Art

For example, a conventional hollow-fibre permeability apparatus is used for blood dialysis in an artificial kidney, in which toxic materials are removed from the blood of a patient suffering from renal failure or medicinal poisoning.

The hollow fibres used in the blood dialysis apparatus provide a relatively large effective surface area of membrane. Therefore, the apparatus can be smaller than conventional coil-type or plate-type blood dialysis apparatus. Thus, the blood priming volume can be smaller, which is beneficial to the patient during dialysis. The apparatus is also easier to handle, and the hollow fibres are superior in withstanding pressure and for ultrafiltration.

Since the blood dialysis apparatus has many advantages above described, it has become popular recently. However, the apparatus has the following disadvantages.

Since the ten to fifteen thousand hollow fibres are closely bundled in the cylindical housing, it is difficult for the dialysate to pass uniformly through the whole of the bundle. It is experimentally proved that the dialysate flow rate is higher around the peripheral region of the bundle adjacent to the inner surface of the housing, and the dialysis is extremely low in the central region of the bundle. It is also found that boundary layers are formed along the outer surfaces of the hollow fibres which reduce the dialysis efficiency.

In order to remove the above described disadvantages, a novel hollow-fibre permeability apparatus was already proposed in the U.S. application Ser. No. 653351, now U.S. Pat. No. 4,082,670, by the same applicant in which at least one portion of the housing is of enlarged cross-section relative to the bundle to define a space between the bundle and a wall of the housing into which at least part of the first fluid can pass in its passage from the inlet to the outlet tube, and the shape of the enlarged cross-section portion promotes cross-flow of the first fluid relative to the fibers.

As the results of further studies, this inventor has found out that the shape of the inlet and outlet portions, and more particularly of the inlet portion for the dialysate greatly affect the flow of the dialysate in the housing, and that the improvement of the shape is very important.

The inlet and outlet portions for dialysate are until now circular in cross section, and so are localized in a much limited position to the permeating region of the housing. Accordingly, the dialysate does not flow uniformly through the whole bundle. This is quite unfavourable in view of the dialysis efficiency, because the contact of the dialysate with membrane is not ideal. The dialysate flow in the housing can be visualized by introducing black ink in the dialysate.

SUMMARY OF THE INVENTION

Accordingly, it is an object of this invention to provide a hollow-fiber permeability apparatus in which a first fluid is not localized in the bundle, the first fluid can uniformly flow through the whole bundle, and thereby better permeability can be obtained.

Another object of this invention is to provide a hollow-fiber permeability apparatus in which the channeling that the first-fluid flow along the inner wall of the housing, can be prevented.

A further object of this invention is to provide a hollow-fibre permeability apparatus in which at least one region of enlarged cross-section is formed in a housing to generate cross flow whereby the first fluid flow through the central region of the bundle is promoted, and the boundary layer formed on the surface of the hollow fibres can be effectively broken.

A still further object of this invention is to provide a hollow-fiber permeability apparatus in which cross flow can be more effectively generated without reducing the flow of the first fluid.

A still further object of this invention is to provide a hollow-fiber permeability apparatus in which effective cross flow can be surely generated.

According to the present invention there is provided a hollow-fibre permeability apparatus comprising a housing; a bundle of permeable-wall hollow fibers disposed in the housing; inlet means for supplying a first fluid into the spaces between the fibers; outlet means for withdrawing the first fluid from the housing, the first fluid being led through at least one of the inlet and outlet means in a lamelliform flow toward the bundle, whereby the first fluid can uniformly flow through the whole bundle; and means for flowing a second fluid inside the fibers such that materials selectively permeate through the walls of the fibers.

BRIEF DESCRIPTION OF THE DRAWINGS

FIG. 4 is a cross-sectional view taken along the line IV—IV of FIG. 2;

FIG. 5 is a cross-sectional view similar to FIG. 4, explaining the shape of an enlarged cross-section portion of the apparatus;

FIG. 6 is a graph showing the relationship between the shape of the inlet portion for dialysate and the dialysance;

FIG. 7 is a cross-sectional view of a modification of the inlet portion for dialysate shown in FIG. 3;

FIG. 8 is a partly broken front view of a modification of the blood dialysis apparatus shown in FIG. 1;

DESCRIPTION OF THE PREFERRED EMBODIMENTS

FIG. 1 to FIG. 28 show a first embodiment of this invention.

Figure 1:
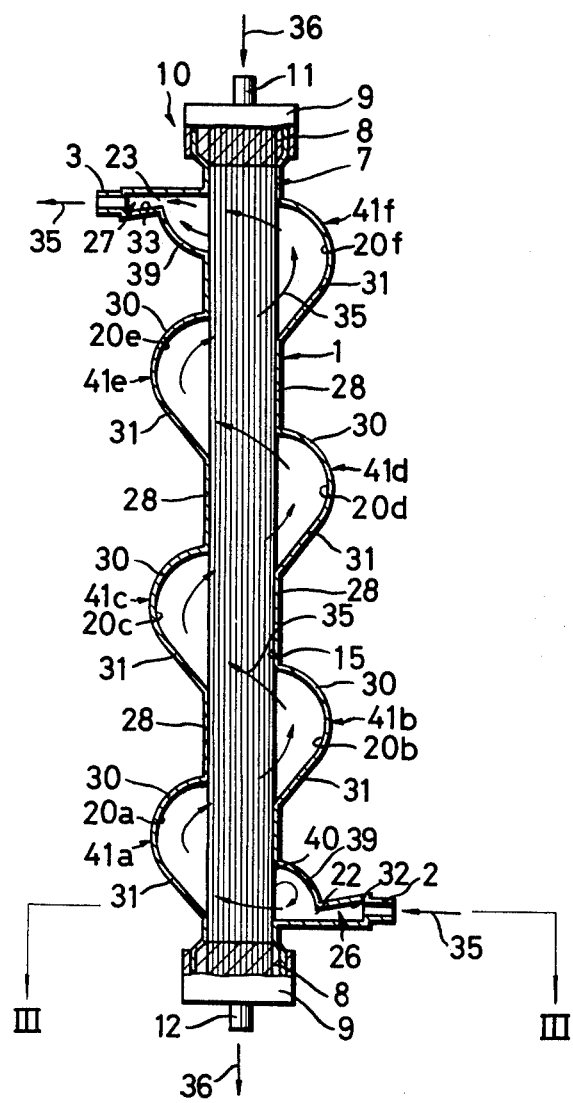
FIG. 1 is a partly broken front view of a blood dialysis apparatus according to a first embodiment of this invention.

Referring to FIG. 1, a blood dialysis apparatus 10 comprises a housing 1 having a substantially rectangular cross-section. Inlet and outlet tubes 2 and 3 for dialysate are horizontally arranged in lower and upper parts of side walls of the housing 1. Enlarged cross-section portions 39 for outlet and inlet portions having quadrant cross sections are formed in the upper end of the left side wall and in the lower end of the right side wall of the housing 1, respectively. Inlet and outlet portions 26 and 27 for dialysate, having tapered surfaces 32 and 33 respectively, are formed integrally with the enlarged cross-section portions 39. The inner ends of the inlet and outlet portions 26 and 27 are slit-opened into the enlarged cross-section portions 39, while the other ends of the inlet and outlet portions 26 and 27 are connected to the inlet and outlet tubes 2 and 3, respectively.

The housing 1 contains a hollow-fiber bundle 7 whose end portions are potted in potting materials 8. A permeating region 15 in the housing 1 is occupied with the bundle 7. At both sides of the permeating region 15, enlarged cross-section portions 41a, 41b, 41c, 41d, 41e and 41f are formed in the side walls of the housing 1. Accordingly, enlarged cross-section spaces 20a, 20b, 20c, 20d, 20e and 20f are formed inside of the housing 1. Each of the enlarged cross-section portions 41a to 41f consists of a curved wall 30 and a substantially flat or slightly concave wall 31 adjacent to the curved wall 30. The bundle 7 is supported by flat, intervening support portions 28 in the housing 1.

At both end portions of the housing 1, covers (not shown) having inlet and outlet tubes 11 and 12 for blood at the centers are fastened with fastening rings 9. Grooves (not shown) are formed in the outer circumferential surfaces of both end portions of the housing 1, and ridges (not shown) are formed on the inner circumferential surfaces of the fastening rings 9. By pushing the fastening rings 9 onto the end portions of the housing 1, the ridges of the fastening rings 9 click into the grooves of the end portions of the housing 1.

The inlet and outlet portions 26 and 27 for dialysate are equal to each other. The construction of the inlet portion 26 is shown in FIGS. 2 and 3.

Figure 2:
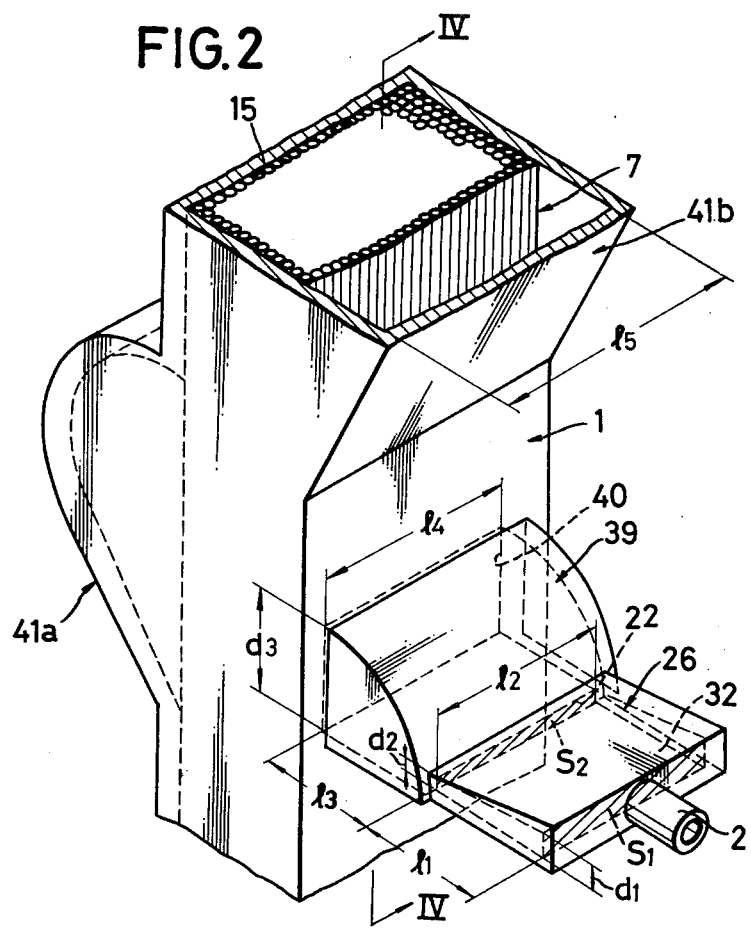
FIG. 2 is an enlarged perspective view of an important part of FIG. 1, including an inlet portion for dialysate.
Figure 3:
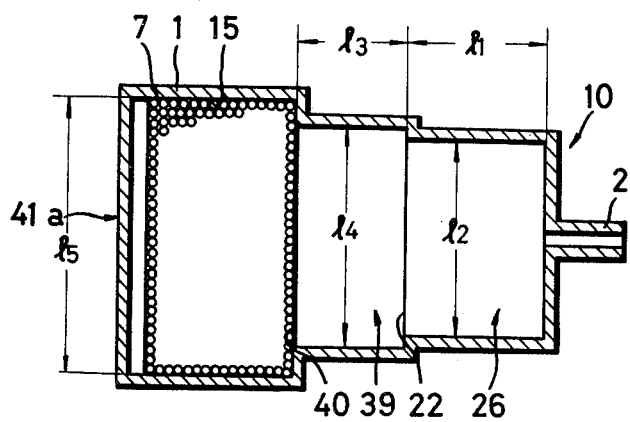
FIG. 3 is an enlarged cross-sectional view taken along the line III—III of FIG. 1.

Referring to FIG. 2, the enlarged cross-section portion 39 is quadrant-cylindrically shaped, extending along the longer side of the cross-section of the housing 1. It has a rectangular opening 40 facing to the bundle 7. At the inlet tube side, the inlet portion 26 is connected to the enlarged cross-section portion 39. The length of the former is nearly equal to that of the latter. Because of the taper surface 32, the height of the inlet portion 26 gradually decreases from the inlet tube 2 toward the enlarged cross-section portion 39.

Between the height $d_2$ of the inner end of the inlet portion 26 and the height $d_3$ of the inner opening 40 of the enlarged cross-section portion 39, the following relationship is required:

$$0 < d_2/d_3 < 1 \tag{1}$$

and preferably $$0 < d_2/d_3 \leqq 0.8 \tag{2}$$

Between the length $l_4$ of the enlarged cross-section portion 39 and the length $l_5$ of the longer side of the cross section of the permeating region 15, the following relationship is required:

$$0.2\, l_5 \leqq l_4 \leqq l_5 \tag{3}$$

and preferably $0.4\, l_5 \leqq l_4 \leqq l_5$ (4).

between the width $l_3$ of the enlarged cross-section portion 39, which extends from the inlet portion 26 to the permeating region 15, and the length $l_5$ of the longer side of the cross section of the permeating region 15, the following relationship is required:

$$l_3 \leqq l_5 \tag{5}$$

And among the volume V of the inner space of the enlarged cross-section portion 39, the length $l_2$ of the inlet portion 26, which extends along the enlarged cross-section portion 39, and the heights $d_2$ and $d_3$, the following relationship is required:

$$\frac{l_3(d_2 + d_3)}{2} \times l_2 \leqq V \tag{6}$$

In other words, it is required that the volume V of the inner space of the enlarged cross-section portion 39 is larger than, or equal to that of an imaginary prism whose trapezoidal base surface area is $l_3(d_2+d_3)/2$, and whose height is $l_2$. In FIGS. 2 and 3, the case of $l_4 > l_2$ is shown. In the case of $l_4 > l_2$, $l_4$ is substituted for $l_2$ in the relationship (6). The height of the imaginary prism is the smaller one of the lengths $l_2$ and $l_4$. Moreover, preferably $$\frac{l_3(d_2 + d_3)}{2} \times l_2 \text{ or } l_4 \leq V \leq l_5 \times l_5 \times l_5 \quad (7)$$

where $l_5 \times l_5 \times l_5$ represents the volume of a imaginary cube whose side length is equal to the length $l_5$ of the longer side of the cross section of the permeating region.

With respect to the inlet portion 26, the following relationship is required:

$$0 - d_2/d_1 < 1 \quad (8),$$

and preferably $$0.02 \leq d_2/d_1 \leq 0.8 \quad (9),$$

where $d_1$ represents the height of the outer end of the inlet portion 26. In another expression of the above relationship (8), $$0 < S_2/S_1 < 1 \quad (10),$$

and preferably $$0.02 \leq S_2/S_1 \leq 0.8 \quad (11),$$

where $S_1$ represents the area of the outer end of the inlet portion 26, and $S_2$ the area of the opening of the inner end of the inlet portion 26.

Between the length $l_1$ of the inlet portion 26 in the flow direction of dialysate, and the length $l_2$ thereof, the following relationship is required:

$$0 < l_1/l_2 \leq 20 \quad (12),$$

and preferably $$0.1 \leq l_1/l_2 \leq 10 \quad (13).$$

And between the lengths $l_2$ and $l_5$, the following relationship is required:

$$0.2 \ l_5 \leq l_2 \leq l_5 \quad (14),$$

and preferably $$0.4 \ l_5 \leq l_2 \leq l_5 \quad (15).$$

Moreover, it is preferable that the above relationships (1)–(15) are fulfilled with respect to the outlet portion 27 for dialysate.

In this embodiment, the above-described dimensions have the following values:

Height of inlet opening 22 of the inlet portion 26: $d_2 = 2$ mm
Height of inner opening 40 of the enlarged cross-section portion 39: $d_3 = 12$ mm
Length of inner opening 40 of the enlarged cross-section portion 39: $l_4 = 60$ mm
Length of the permeating region 15: $l_5 = 70$ mm
Width of the enlarged cross-section portion 39: $l_3 = 12$ mm
Length of the inlet portion 26: $l_2 = 60$ mm
Height of outer end of the inlet portion 26: $d_1 = 4$ mm
Width of the inlet portion 26: $l_1 = 30$ mm In the above-relationship (1)–(15),
$d_2/d_3 \approx 0.17$
$l_4 \approx 0.86 \ l_5$
$l_3 \approx 0.17 \ l_5$ $$\frac{l_3(d_1 + d_2)}{2} \times l_2 \text{ or } l_4 = 5040 \text{ mm}^3$$

$V = 7800 \text{ mm}^3$
$l_5^3 = 343000 \text{ mm}^3$
$d_2/d_1 = 0.5$
$S_2/S_1 = 0.5$
$l_1/l_2 = 0.5$
$l_2 \approx 0.86 \ l_5$ In the above-described construction, as shown in FIG. 5, the dialysate 35 is supplied into the inlet portion 26 from the inlet tube 2. The dialysate flow is distributed over the length $l_2$ in the inlet portion 26. The thickness of the dialysate flow is diminished by the taper surface 32. The dialysate flow rushes out into the enlarged cross-section portion 39 through the slit-like opening 22 of the inlet portion 26 over the whole length $l_2$ of the inlet portion 26, and is uniformly distributed over the length $l_4$ of the enlarged cross-section portion 39. The lemelliform dialysate flow effectively penetrates into the hollow-fiber bundle 7, and it is led into the enlarged cross-section space 20a. The dialysate flow deflected along the enlarged cross-section portion 41a and successively travels through the hollow fiber bundle 7 into the enlarged cross-section space 20b. Thus, cross flow of the dialysate can be effectively obtained.

In the meanwhile, a part of the incoming dialysate flow from the inlet openings 22 which collides with the bundle 7 can turn its flow direction, as shown by the curved arrow in FIG. 4. Since the enlarged cross-section portion 39 has a space with little resistance to the dialysate flow, the rebounded dialysate flow which is induced by the collision of the incoming dialysate with the bundle 7 can be easily merge with the main stream of the dialysate flow in the enlarged cross-section portion 39.

Since the enlarged cross-section portion 39 presents room for retreat of the rebounded part of the dialysate flow, the channeling flow of the dialysate upward along the inner wall of the housing 1 can be effectively prevented. And since the rebounded part of the dialysate flow merges with the main stream of the dialysate flow, the cross-flow component of the dialysate, and therefore the dialysis efficiency can be improved.

This embodiment has the advantage that the dialysate can be uniformly and laminally distributed to the bundle 7 through the inlet portion 26 having the taper surface 32, and that the cross-flow component of the dialysate can be increased by the enlarged cross-section portion 39.

The behavior of the dialysate in the outlet portion 27 and upper enlarged cross-section portion 39 is different from that of the dialysate in the inlet portion 26 and lower enlarged cross-section portion 39. In the former case, the dialysate is widely collected by the upper enlarged cross-section portion 39, and is uniformly discharged through the outlet portion 27 having the slit-like outlet opening 23 and taper surface 33. The outlet portion 27 and upper enlarged cross-section portion 39 contribute to the smooth flow of the dialysate. The upper part of the inlet-side enlarged cross-section portion 39, and the lower part of the outlet-side enlarged cross-section portion 39 have curved surfaces which play the role of developing a smooth flow along the curved surface in the enlarged cross-section portion 39.

In order to obtain the effective cross flow, it is important to develop even the flows of the dialysate. The shape of the enlarged cross-section portions 41a to 41f play an important role for developing the even flow of the dialysate.

In order to generate the effective cross flow of the dialysate, the following relationships should be fulfilled, referring to FIG. 5:

$$\frac{1}{4} A \leq L \leq 4A \qquad (16)$$

$$A \leq D \leq 12A \qquad (17)$$

$$0 \leq d = D \qquad (18)$$

where A, L, d and D represent the depth of the bundle 7, the height of the enlarged cross-section portion 41a to 41f in the direction perpendicular to the lengthwise direction of the bundle 7, the length of the flat support portion 28, and the length of the enlarged cross-section portion 41a to 41f in the lengthwise direction of the bundle 7, respectively. When the shape and position of the enlarged cross-section portion 41a to 41f are fulfilled by the above relationships (16), (17) and (18), the dialysate can smoothly flow back and forth across the bundle of fibers without generating voltex and channelling. More preferably, the relationships (16), (17) and (18), are reduced to $\frac{1}{2} A \leq L \leq 2A$, and $A \leq D \leq 8A$.

In order to generate more effective cross flow of the dialysate, the following relationships are required:

$$30° \leq \alpha \leq 90° \qquad (19)$$

and $$5° \leq \theta \leq 80° \qquad (20)$$

where $\alpha$ and $\theta$ are defined as follows: Four straight lines are drawn in the downstream and upperstream directions at angles of 10° and 20° respectively to the lengthwise direction of the bundle 7 from the middle point P between the upstream end Q and the downstream end R of the enlarged cross-section portion 41C; Two lines tangential to the wall of the enlarged cross-section portion are drawn through two arbitrary points S and T between the 10°-lines and 20°-lines, respectively; $\alpha$ and $\theta$ are the angles of the tangent lines to the lengthwise direction of the bundle 7, respectively.

The above relationships (19) and (20), preferably are reduced to $45° \leq \alpha \leq 90°$, $5° \leq \theta \leq 60°$, and more preferably to $10° \leq \theta \leq 45°$.

It is preferable that the packing density of the hollow fibers in the permeating region 15 is 10–60%, more preferably 30–55%, and most preferably 45–55%. Within such ranges, the dialysate can smoothly flow through the permeating region 15.

Next, the flow of the dialysate 35 in the dialysis apparatus 10 will be described with reference to FIG. 1

Thanks to the presence of the enlarged cross-section portions 41a to 41f formed in the housing 1, the dialysate 35 undulately flows upward through the housing 1. The incoming dialysate 35 penetrates uniformly into the bundle 7 through the slit-like opening 22 from the inlet portion 26. After the dialysate flows across the bundle 7, it flows into the enlarged cross-section space 20a, where the dialysate can smoothly deflect along the flat wall 31, and the curved wall 30, and then travel across the bundle 7. The behavior of dialysate in the second enlarged cross-section space 20b is the same as in the first enlarged cross-section space 20a. The similar behavior of the dialysate can be seen in all enlarged cross-section spaces 20a to 20f, thus the cross flow can be effected during the upward movement of the dialysate, which effects penetration of dialysate into the central portion of the bundle 7. The boundary layers formed along the membranes of the hollow fibers are widely broken up by the turbulences developed by the collision of the cross flow with the hollow fibers. As the result, a high dialysis efficiency can be obtained.

The experiments were made using the apparatus of FIG. 1. The effective membrane area of the hollow-fiber bundle 7 was about 1 m². The comparison experiments were made using the dialysis of the other apparatus in which the enlarged cross-section portions 39 were omitted.

In those experiments, pseudo-blood 36 which was the solution of urea, creatinine and vitamin $B_{12}$ in distilled water, was used being flowed inside the hollow fibers at the rate of 200 ml/min., and the distilled water as the dialysate 35 was flowed from the inlet tube 2 at the rate of 500 ml/min. in the housing. The dialysance D (as defined by Wolff), is represented by the following furmula:

$$D = Qb \cdot \frac{Cbi - Cbo}{Cbi - Cdi} \qquad (21)$$

where Qb Cbi, Cdi and Cbo represents a flow rate of blood, a concentration of the blood at the inlet opening, a concentration of the dialysate at the inlet opening, and a concentration of the blood at the outlet opening, respectively. The results are shown in Table I.

Table I

| | Dialysance (ml/min) | | |
|---|---|---|---|
| | Urea | Creatinine | Vitamine $B_{12}$ |
| This embodiment | 166 | 138 | 38 |
| Comparison apparatus (without the enlarged cross-section portion 39) | 145 | 127 | 32 |

As apparent from Table I, the dialisance is higher in this embodiment than in the apparatus from which the enlarged cross-section portions 39 are omitted for comparison. In this embodiment, the enlarged cross-section portion 39 functions as room for retreat of a part of the dialysate rebounded on the bundle 7. This functions to minimize the channeling and contributes to effect favourable cross-flow more uniformly distributed over the whole bundle 7.

Another experiment was made to confirm the effect of the relationships (8) to (10) or particularly of the relationship (10). The results are shown in FIG. 6. As apparent from FIG. 6, the dialysances of the components are significantly rised with decreasing the area ratio $S_2/S_1$, especially around $S_2/S_1$ in unity.

During the course of study, it is found that the upper enlarged cross-section portion 39 for the outlet portion 27 may be omitted from the apparatus of FIG. 1 without reducing its performance. In this case, the outlet opening 23 of the outlet portion 27 faces directly with the bundle 7. The dialysances were measured under the same condition as in the above-described experiments. The dialysate flow did not change much compared with the case of the apparatus of FIG. 1 and comparable dialysances resulted.

The above fact proves that the enlarged cross-section portion 39 should be arranged at least at the inlet side of the apparatus.

FIG. 7 shows a modification of the inlet section of the apparatus, corresponding to FIG. 3. In this modification, two enlarged cross-section portions 49, which correspond to the enlarged cross-section portion 39, of FIG. 1 to FIG. 3, and two inlet portions 46 corresponding to the inlet portion 26 are arranged in parallel with each other. The two inlet portions 46 are communicated with the inlet tube 2 through a common distributing portion 50. The heights $d_2$ of the inner openings 42 of the inlet portions 46 having the taper surface are 2 mm, and the heights $d_3$ of the inner openings 40 of the enlarged cross-section portions 49 are 12 mm. Accordingly, the ratio $d_2/d_3$ is about 0.17. The lengths $l_4'$ of the enlarged cross-section portions 49 are 25 mm, and the length $l_5$ of the enlarged cross-section portion 41a opposite to the two enlarged cross-section portions 49 is 70 mm. Accordingly, the ratio $l_4'/l_5$ is 0.36. Since the enlarged cross-section portions 49 have the round walls of radius 12 mm, the lengths $l_3$ between the inner openings 43 and outer openings 42, of the enlarged cross-section portions 49 are 12 mm. The length $l_3$ is smaller than the length $l_5$. The heights $d_1$ of the outer openings of the inlet portions 46 are 5 mm, the lengths $l_1$ of the inlet portions 46 in the flow direction of the dialysate are 20 mm, and the lengths $l_2'$ of the inner openings 42 of the inlet portions 46 are 25 mm. Thus, the ratio $S_2/S_1$ is 0.4, and the ratio $l_1/l_2'$ is 0.8. The volumes of the enlarged cross section portions 49 are about 2.8 cm$^3$ each.

Next, the dialysis performance of the above described modification was measured under the same condition as in the above experiments for the apparatus of FIG. 1. The result was not significantly different from that by the apparatus of FIG. 1, showing comparable dialysance.

FIG. 8 shows modification of the apparatus of FIG. 1. In this modification, the inlet tube 2, the inlet portion 26, the outlet tube 3, and the outlet portion 27 are used for recycling the dialysate. An other inlet tube 52 and another inlet portion 56 are connected to the lowermost enlarged cross section portion 41a for supplying a fresh dialysate into the housing, while an other outlet tube 53 and an other outlet portion 57 are connected to the uppermost enlarged cross-section portion 41f for discharging the dialysate from the housing 1 at the same flow rate that the fresh dialysate is supplied into the housing 1.

Although not shown in FIG. 8, a recycle tube is connected between the inlet and outlet tubes 2 and 3, in which a check valve, a recycle pump and a flow-adjusting valve are connected.

Next, dialysis operation of the apparatus of FIG. 8 will be described. In this operation, the solution of urea, creatinine and vitamin B$_{12}$ dissolved into distilled water was used as pseudo-blood, as above described. Distilled water was used as the dialysate. The pseudo-blood 36 was flowed through inside the hollow fibers at the rate of 200 ml/min. The dialysate 35 was recycled through the inlet opening 22 and outlet opening 23 at the flow rate of 1 l/min. by the recycle pump. The fresh dialysate 35 was supplied into the housing 1 from the inlet opening 62 of the inlet portion 56 at the flow rate of 500 ml/min, and the dialysate was discharged from the housing 1 through the outlet opening 63 of the outlet portion 57. The results are shown in Table II.

Table II

|  | Dialysance (ml/min) | | |
| --- | --- | --- | --- |
|  | Urea | Creatinine | Vitamin B$_{12}$ |
| Apparatus of Fig. 8 | 168 | 140 | 39 |

It will be understood that the dialysis efficiency is more improved, since the dialysate 35 is recycled through the inlet and outlet portions 26 and 27 having the taper surface under the function of the enlarged cross-section portions 39 while the fresh dialysate 35 is supplied into the housing 1. Due to the effective cross flow of the dialysate, the dialysate is uniformly distributed throughout the bundle 7 and the thicknesses of the boundary layers formed on the hollow fibers are widely reduced. The above experiments proved the superiority of the apparatus according to this invention in dialysis efficiency.

Next, the cross flow in the apparatus according to this invention will be described in more detail, with reference to FIG. 8.

With the suction by the recycle pump, the dialysate in the upper part of the enlarged cross-section space 20f is led out from the outlet opening 23 passing through the bundle 7. The dialysate in the lower part of the enlarged cross-section space 20f moves easily to the upper part thereof, since there is very little low resistance for the movement. Following this movement, the dialysate located in the inside of the bundle 7 flows into the lower part of the enlarged cross-section space 20f. Such movements or flows are trans-mitted downwardly in the housing 1. As the results, the dialysate undulatedly flows upwardly through the housing 1, as shown by the arrows in FIG. 8. With the repeated cross-flows of the dialysate through the bundle 7, the total amount of the dialysate passing through the central portion of the bundle 7 is much larger than for the conventional apparatus. Moreover, the dialysate flows more uniformly through the bundle 7. Accordingly, the effective difference in the concentration of materials in the blood and in the dialysate 35 can be maintained with the membrane between. As a result, good dialysis efficiency can be obtained. With the increase of the recycling rate of the dialysate 35, the dialysate 35 flows through the permeating region 15 at much higher rate, therefore, the boundary layers formed on the membranes of the hollow fibers can be more effectively broken. The extent of the breaking of the boundary layers can be easily varied with the variation of the recycling rate of the dialysate.

In this embodiment, the inlet and outlet portions or particularly the inlet portion may be modified, as shown in FIG. 9 to FIG. 15.

Figure 9:
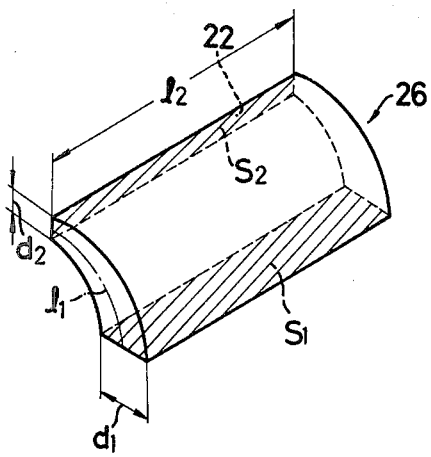
FIGS. 9 to 15 are perspective views of different inlet portions for dialysate.

The inlet portion 26 of FIG. 9 is formed by curved walls. The height of the inlet portion 26 is continuously diminished from the outer end ($d_1$) toward the inner opening 22 ($d_2$).

Figure 10:
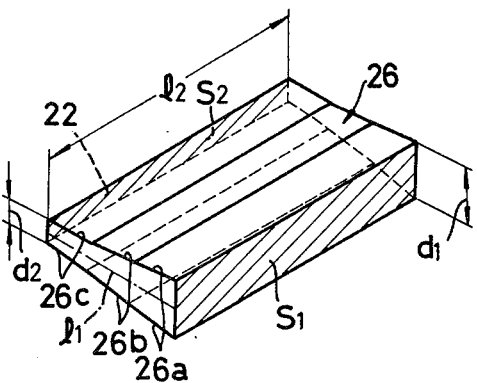

The inlet portion 26 of FIG. 10 is formed by three pairs of flat walls 26a, 26b and 26c which are differently inclined so as to diminish the height of the inlet portion 26 from the outer end toward the inner opening 22.

Figure 11:
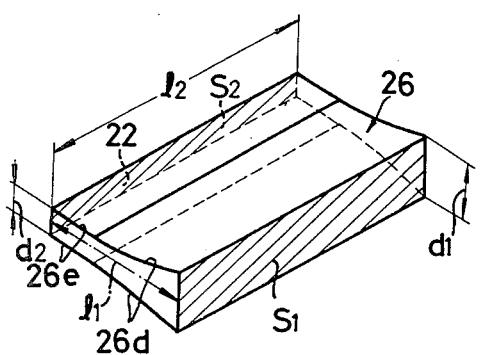

The inlet portion 26 of FIG. 11 is formed by a pair of flat walls 26e and another pair of curved walls 26d so as to diminish the height of the inlet portion from the outer end toward the inner opening 22.

Figure 12:
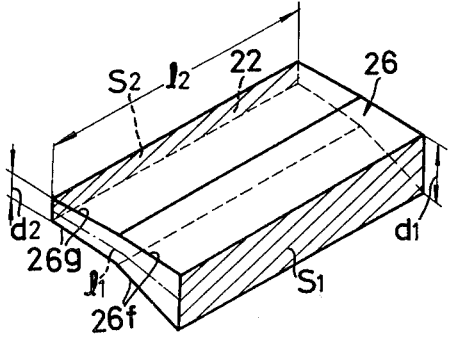

The inlet portion 26 of FIG. 12 is formed by a pair of inclined flat walls 26f and another pair of flat walls 26g so as to diminish the height of the inlet portion 26 from the outer end toward the inner opening 22.

Figure 13:
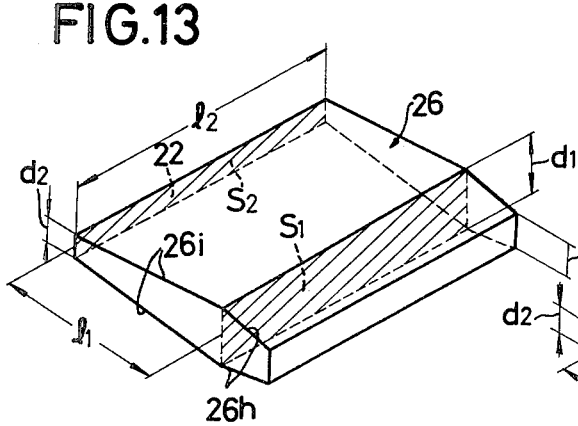

The inlet portion 26 of FIG. 13 is formed by a pair of flat walls 26h inclined to the outer end, and another pair of flat walls 26i inclined to the inner opening 22. The height of the inlet portion 26 is the maximum at the boundary between the pairs. The maximum height corresponds to the above-described height $d_1$. The height $d_3$ of the outer end of the inlet portion 26 is smaller than the height $d_1$.

Figure 14:
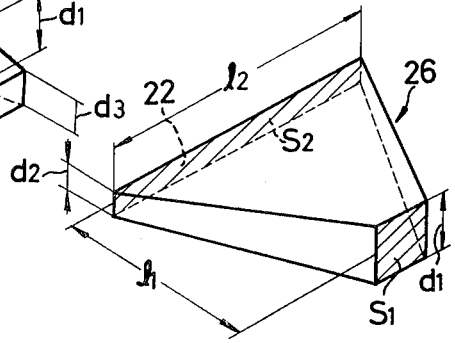

The inlet portion 26 of FIG. 14 is formed by a pair of inclined flat walls so as to continuously diminish the height of the inlet portion 26. In this inlet portion 26, the side walls are inclined to each other so as to continuously diminish the width of the inlet portion 26 toward the outer end.

Figure 15:
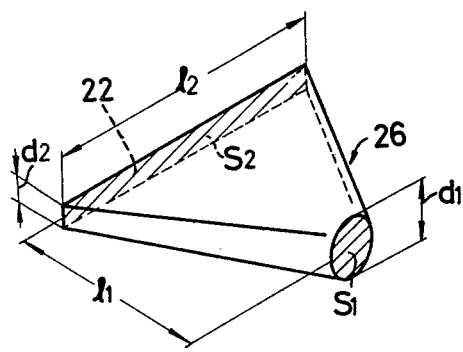

The inlet portion 26 of FIG. 15 is formed similarly to that of FIG. 14. However, the outer end of the inlet portion 26 of FIG. 15 is circular, while the outer end of the inlet portion 26 of FIG. 14 is rectangular.

In the apparatus of FIG. 1 to FIG. 8, three-way valves may be used as the inlet and outlet tubes 2 and 3. In the apparatus of FIG. 8, the outlet portion 27 does not need the taper wall, while the inlet portion 26 needs the taper wall.

In FIG. 7, any of the inlet portions 26 shown in FIG. 9 to FIG. 15 may be used for the two inlet portions 46. The two inlet portions 46 may be same or different from each other in construction.

Figure 16:
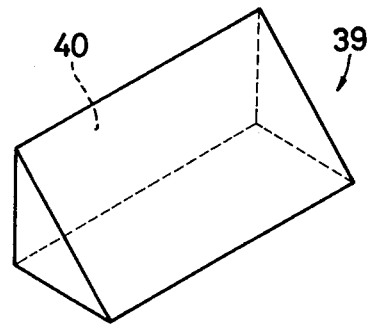
FIGS. 16 to 20 are perspective views of different enlarged cross-section portions to be combined with the inlet portion for dialysate.
Figure 17:
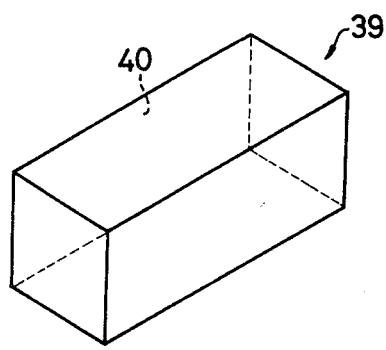
Figure 18:
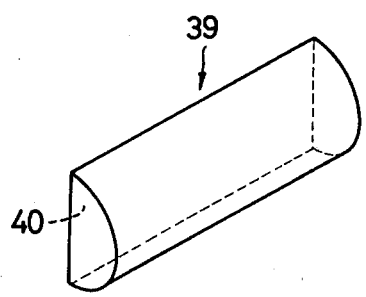
Figure 19:
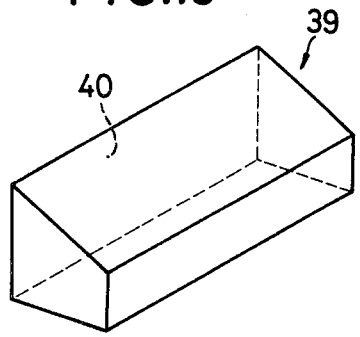
Figure 20:
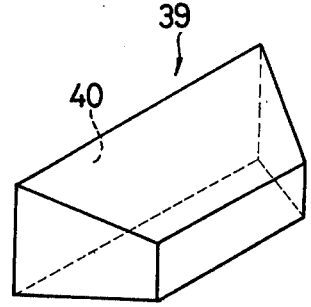

FIG. 16 to FIG. 20 show different modifications of the enlarged cross-section portions 39 and 49. The enlarged cross-section portion 39 of FIG. 16 is triangular in cross section. The enlarged cross-section portion 39 of FIG. 17 is square in cross section. The enlarged cross-section portion 39 of FIG. 18 is semicircular in cross section. The enlarged cross-section portions 39 of FIG. 19 and FIG. 20 are trapezoidal in cross section. In FIG. 19, the side walls are parallel with each other. However, in FIG. 20, the side walls are inclined to each other.

Figure 21:
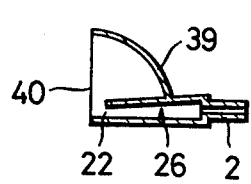
FIGS. 21 to 28 are cross-sectional views of different combinations of the inlet portions for dialysate and enlarged cross-section portions.
Figure 22:
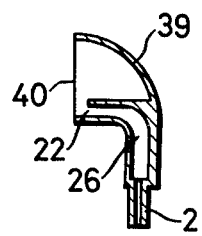
Figure 23:
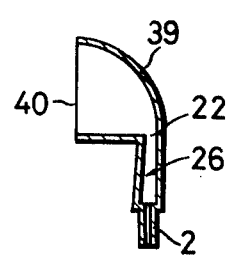
Figure 24:
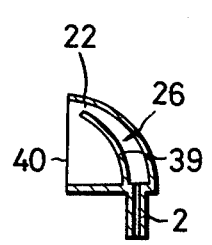
Figure 25:
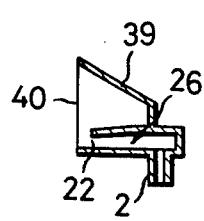
Figure 26:
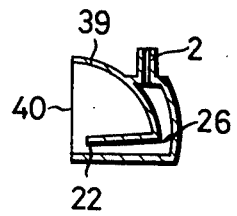
Figure 27:
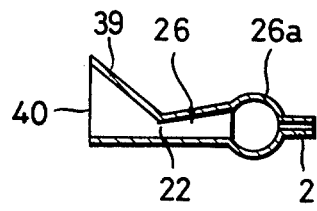
Figure 28:
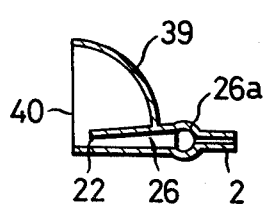

FIG. 21 to FIG. 28 show different modifications of the inlet section consisting of the inlet portion 26 and the enlarged cross-section portion 39. In FIG. 21, the inlet portion 26 projects into the enlarged cross section portion 39 quadrantal in cross section, and the inlet opening 22 of the inlet portion 26 is adjacent to the opening 40 of the enlarged cross-section portion 39. The inlet section of FIG. 22 is different from that of FIG. 21 in construction, the inlet portion 26 being curved substantially at a right angle. In that construction, the inlet tube 2 connected to the inlet portion 26 extends downwardly. The inlet section of FIG. 23 is different from that of FIG. 22 in construction, that is, the inlet portion 26 does not project into the enlarged cross-section portion 39, and the inlet opening 22 of the inlet portion 26 is flush with the bottom surface of the enlarged cross-section portion 39. In the inlet section of FIG. 23, the dialysate is led into the enlarged cross-section portion 39 tangentially to the curved wall thereof. The inlet section of FIG. 24 is different from that of FIG. 23 in construction, the inlet portion 26 extending along the curved wall of the enlarged cross-section portion 39. In the inlet section of FIG. 25, in comparison with that of FIG. 21, the enlarged cross-section portion 39 is trapezoidal in cross section, and the inlet tube 2 is vertically connected to the inlet portion 26. In the inlet section of FIG. 26, in comparison with that of FIG. 22, the inlet portion 26 extends upwardly along the outer surface of the curved wall of the enlarged cross-section portion 39. In the inlet section of FIG. 27, the enlarged cross-section portion 39 is trapezoidal in cross section, and the inlet portion 26 connected horizontally to the enlarged cross-section portion 39 includes an ancillary inlet portion 26a circular in cross section. The inlet section of FIG. 28 comprises the combination of the inlet sections of FIG. 21 and FIG. 27. In FIG. 28, the inlet portion 26 projects into the enlarged cross-section portion 39 quadrantal in cross section. The inlet portion 26 includes the ancillary inlet portion 26a.

In the above-described apparatus, one inlet portion can be arranged for one or a plurality of the enlarged cross-section portions. Alternatively, one enlarged cross-section portion may be arranged for a plurality of the inlet portions. Moreover, the enlarged cross-section portions 41a to 41f may be formed by flat guide walls which are alternately arranged on the inner opposite surfaces of the housing 1.

Next, a second embodiment of this invention will be described with reference to FIG. 29 to FIG. 33.

In this embodiment, the enlarged cross-section portions 39 or 49 of the first embodiment are omitted. The inlet and outlet portions 26 and 27 face directly to the bundle 7. Inlet enlarged cross-section portions 18 and 19 are connected between the inlet tube 2 and the inlet portion 26, and between the outlet tube 3 and the outlet portion 27, respectively.

Figure 30:
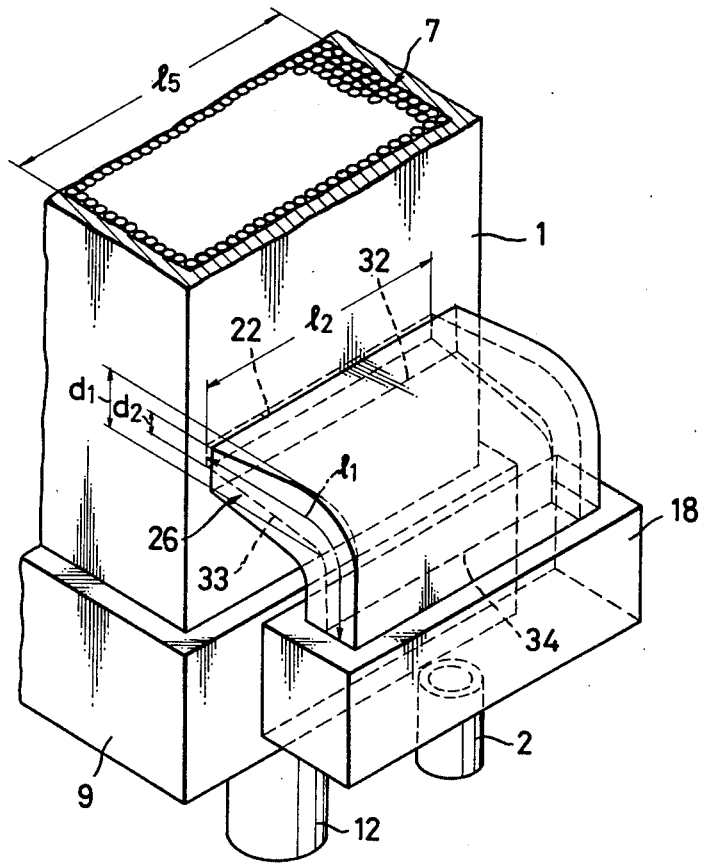
FIG. 30 is an enlarged perspectivew view of an important part of FIG. 29, including an inlet portion for dialysate.
Figure 31:
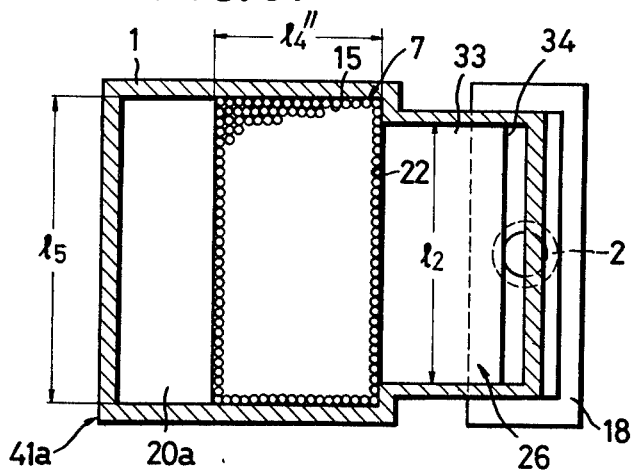
FIG. 31 is an enlarged cross-sectional view taken along the line XXXI—XXXI of FIG. 29.

The inlet and outlet portions 26 and 27 for dialysate are similar to each other in construction. The construction of the inlet portion 26 is shown in FIG. 30 and FIG. 31. The inlet enlarged cross-section portion 18 is in the shape of parallelepiped. The inlet portion 26 is formed by curved walls 32 and 33 so that the height of the inlet portion 26 gradually diminishes toward the slit-like inlet opening 22. The width $l_5$ of the bundle 7 is nearly equal to that $l_2$ of the inlet opening 22 of the inlet portion 26.

It is preferable that the relationships among the height $d_2$ of the inlet opening 22, the width $l_2$ thereof, the width $l_5$ of the permeating region 15, the length $l_1$ of the inlet portion 26, the height $\alpha_1$ of the outer opening of the inlet portion 26, and the ratio $S_2/S_1$ between both openings of the inlet portion 26 fulfill the requirements shown in the relationships (8)–(15) described in the first embodiment.

Since the height of the inlet portion 26 continuously diminishes toward the inlet opening 22, the dialysate lamelliformly flows into the bundle 7 through the slit-like opening 22. The dialysate thus uniformly distributed to the bundle, and as a results more effective cross flow can be obtained.

It is preferable that the requirements (8)–(9), and (12)–(15) are fulfilled also with respect to the outlet portion 27. In such a case, the dialysate can be uniformly discharged from the housing 1 through the outlet portion 27. The dialysis effeciency can be more improved.

In this embodiment, the following values are given for the respective parts:
Height of the opening 34: $d_1 = 4$ mm
Height of the inlet opening 22: $d_2 = 2$ mm
Length of the inlet portion 26: $l_1 = 30$ mm
Width of the inlet opening 22: $l_2 = 60$ mm
Width of the permeating region 15: $l_5 = 65$ mm Depth of the permeating region 15: $l_4'' = 15$ mm
Height of the permeating region 15: $h_1 = 250$ mm
Height of the housing 1: $h_2 = 300$ mm
In the requirements (8)–(15):

$$d_2/d_1 = 0.5$$

$$l_1/l_2 = 0.5$$

and $$l_2 = 12/13 \cdot l_5.$$

Figure 29:
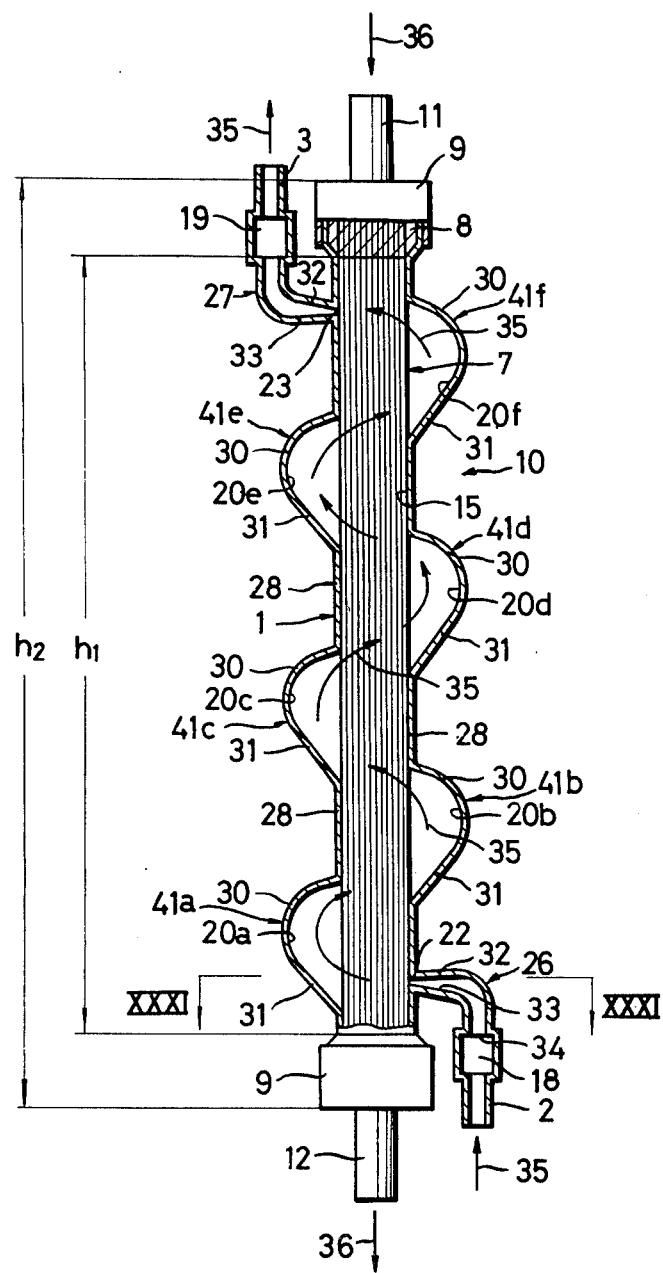
FIG. 29 is a partly broken front view of a blood dialysis apparatus according to a second embodiment of this invention.

The experiments were made on the dialysis of the apparatus of FIG. 29. The effective membrane area of the bundle 7 contained in the housing 1 was 1 m². The comparison experiment was made on the dialysis of an apparatus in which the height of the inlet portion 26 was constant, namely in which the height $d_1$ was constant, namely in which the height $d_1$ was 2 mm, and $d_2/d_1 = 1$. The results are shown in Table III.

Table III

|  | Dialysance (ml/min) | | |
| --- | --- | --- | --- |
|  | Urea | Creatinine | Vitamin $B_{12}$ |
| Apparatus of Fig. 29 | 155 | 127 | 40 |
| Comparison Apparatus | 132 | 118 | 37 |

As apparent from Table III, the dialysance is higher in the apparatus having the tapered inlet portion 26.

Figure 32:
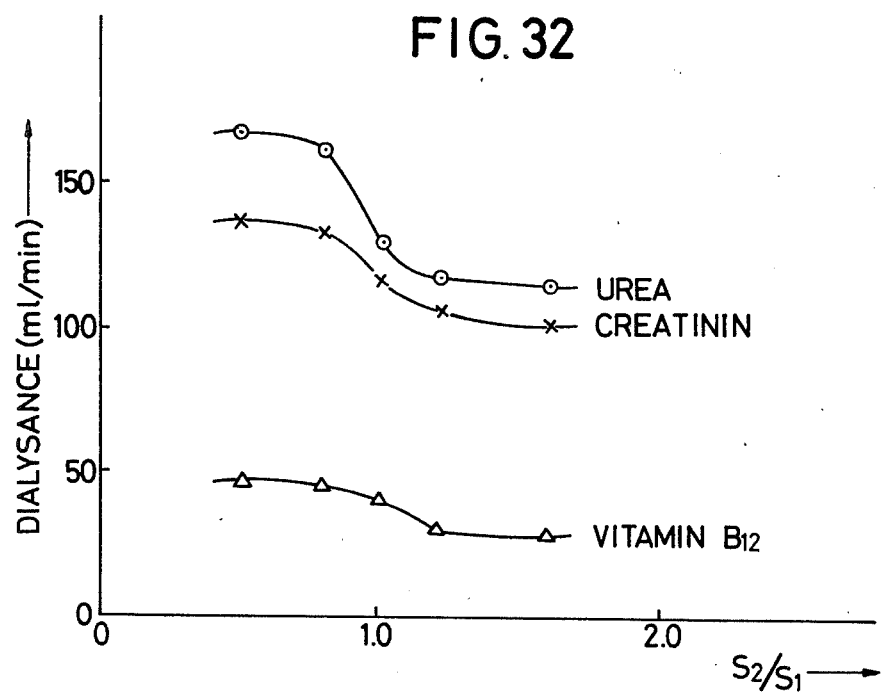
FIG. 32 is a graph showing the relationship between the shape of the inlet portion for dialysate and the dialysance.

Some experiments were made in view of the influence of the ratio $S_2/S_1$ under the same condition as in the above-described experiments. The results are shown in FIG. 32. As apparent from FIG. 32, the dialysances of the respective components increase with decreasing the ratio $S_2/S_1$ especially sharply at $S_2/S_1$ of unity.

When using the apparatus in which the height of the outlet portion 27 was constant while the inlet portion 26 was tapered, the dialysances were substantially the same as in the apparatus of FIG. 29.

Figure 33:
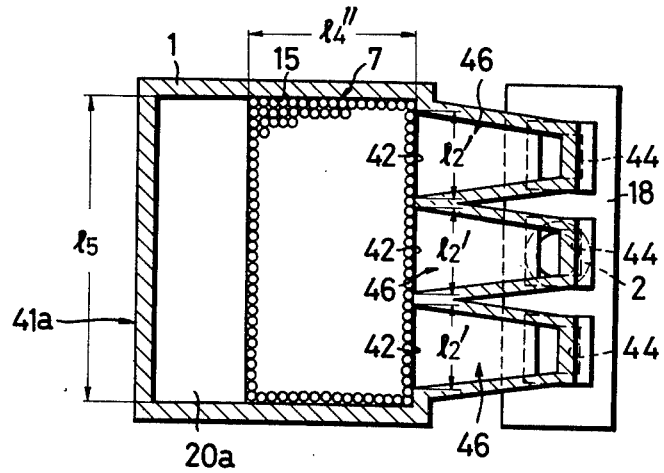
FIG. 33 is a cross-sectional view of a modification of the inlet portion for dialysate shown in FIG. 31.

FIG. 33 shows a modification of the apparatus of FIG. 29 to FIG. 31. In this modification, three inlet portions 46 equal in construction are arranged. Side walls are tapered toward each other in contrast to those of FIG. 31. The length $l_1$ of the inlet portions (see FIG. 30) 46 is 20 mm, and the length $l_2'$ of the inlet openings 42 of the inlet portions 46 is 20 mm, which is larger than that of the outer openings 44 of the inlet portions 42 communicating with the inlet enlarged cross-section portion 18.

For the respective parts of this modification, the following values are given:
Height of the openings 44: $d_1 = 4$ mm
Height of the inlet openings 42: $d_2 = 2$ mm
Length of the inlet portions 46: $l_1 = 20$ mm
Width of the inlet openings 42: $l_2' = 20$ mm
Width of the permeating region 15: $l_5 = 65$ mm
In the requirements (8)–(9), and (12) to (15), $d_2/d_1 = 0.5$, and $l_1/l_2' = 1.0$.

The total width of the three inlet openings 42 is $20 \times 3 = 60$ mm. The relationship between the width $l_2$ of the inlet opening 22 of the inlet portion 26 of FIG. 30 and the width $l_2'$ of the inlet opening 42 of the inlet portion 46 is as follows: $l_2 = 3l_2' = 12/13 \cdot l_3$. Accordingly, the above relationships fulfill the requirements (8), (9) and (12) to (15).

In the apparatus of FIG. 33, the dialysate is distributed into the three inlet portions 46 form the common inlet enlarged cross-section portion 18, and it flows uniformly into the bundle 7 through the slit-like openings 42. Since the side walls of the inlet portions 46 are tapered, the dialysate can be more uniformly distributed to the bundle 7.

As in the apparatus of FIG. 8 according to the first embodiment of this invention, the dialysate 35 was recycled through the housing 1 in the apparatus of FIG. 29; making up and waste of dialysate being made in the recycling route. The results are shown in Table IV.

Table IV

|  | Dialysance (ml/min) | | |
| --- | --- | --- | --- |
|  | Urea | Creatinine | Vitamin $B_{12}$ |
| Apparatus of Fig. 29 | 158 | 132 | 43 |

As apparent from Table IV, the dialysance is improved for the component having the middle molecular weight ($B_{12}$). Also in this experiment by speeding up of dialysate flow, effective cross flow occurs, and the dialysate is uniformly penetrated into the central portion of the bundle 7 and the boundary layers formed on the membranes of the hollow fibers are much reduced. These effects increases the dialysis efficiency. In this embodiment, the inlet and outlet portions may be modified as in FIG. 9 to FIG. 15.

Next, a third embodiment of this invention will be described with reference to FIG. 34 to FIG. 36.

Figure 34:
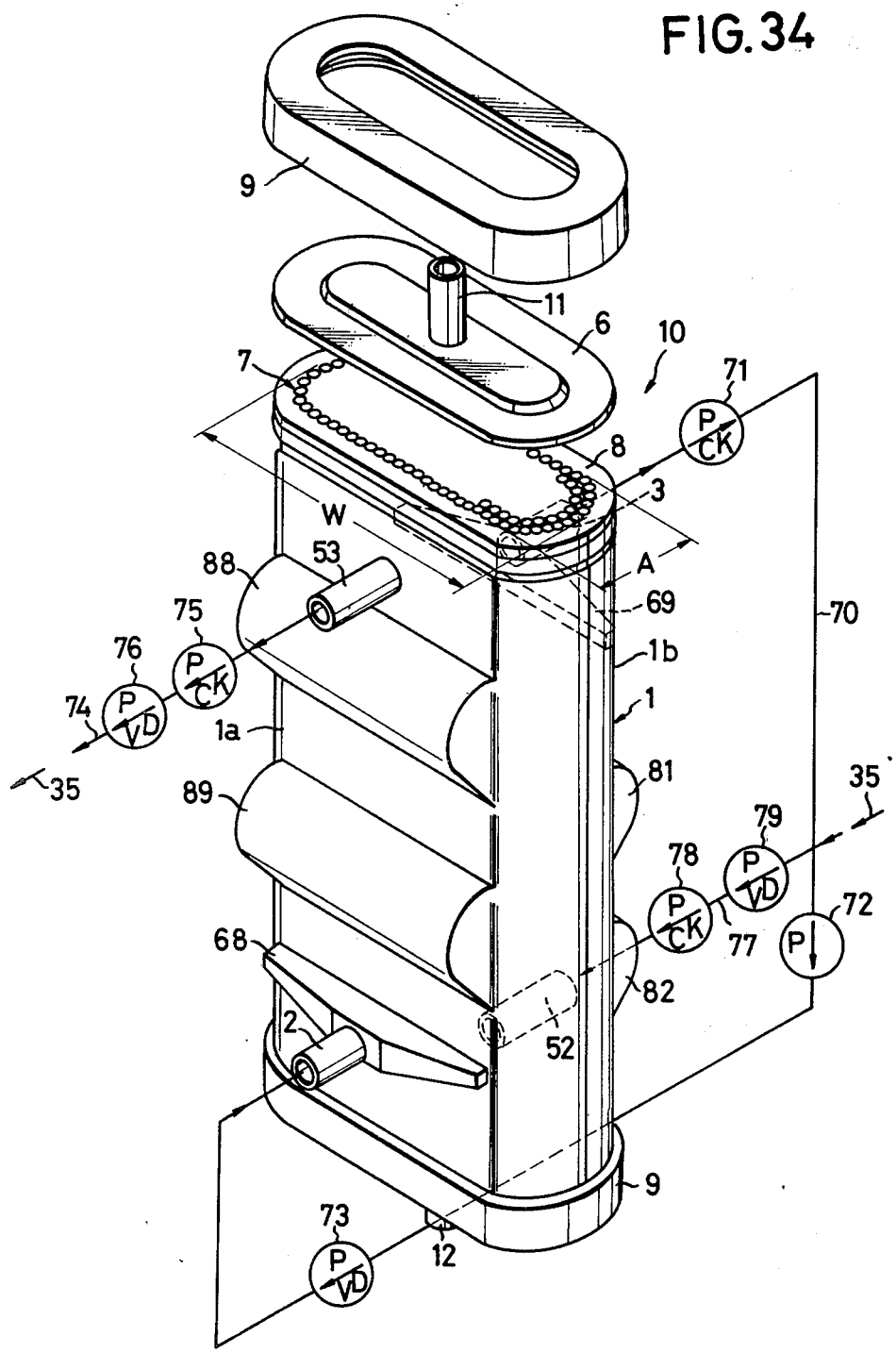
FIG. 34 is a perspective view of a blood dialysis apparatus according to a third embodiment of this invention, partly exploded.

In the apparatus of FIG. 34, inlet and outlet portions 68 and 69, which are trapezoidal in cross section, are formed on the lower and upper portions of the side walls of the housing 1, respectively. The slit-like openings of the inlet and outlet portions 68 and 69 face to the bundle 7. The inlet and outlet tubes 2 and 3 are connected to the inlet and outlet portions 68 and 69. The inlet tube 52 is for supplying the dialysate, and the outlet tube 53 is for discharging the dialysate, both are connected directly to the side walls of the housing 1. A recycling tube 70 is connected to the outlet tube 3. A discharge tube 74 is connected to the outlet tube 53. Another end of the discharge tube 74 is connected to a discharge tank (not shown). A supply tube 77 is connected to the inlet tube 52. Another end of the supply tube 77 is connected to a supply tank for dialysate (not shown). In the tubes 70, 74 and 77, check valves, flow adjusting valves 73, 76 and 79 and a recycle pump 72, as occasion demands, may be arranged.

As in the above embodiments, enlarged cross-section portions 88, 89 and 81, 82 are alternately formed in the side walls 1a and 1b combined to form the housing 1. The inlet and outlet portions 68 and 69 extend over the width W of the bundle 7. The heights of the slit-like openings of the inlet and outlet portions 68 and 69 are about 6 mm. It is preferable that the relationship between the width W of the permeating region and the depth A thereof is $W = kA$ ($k > 1$, or practically $1 < k \leq 40$) in order to improve the dialysis efficiency. Preferably, $k = 1.5$–$15$, and more preferably $k = 2$–$8$.

Figure 35:
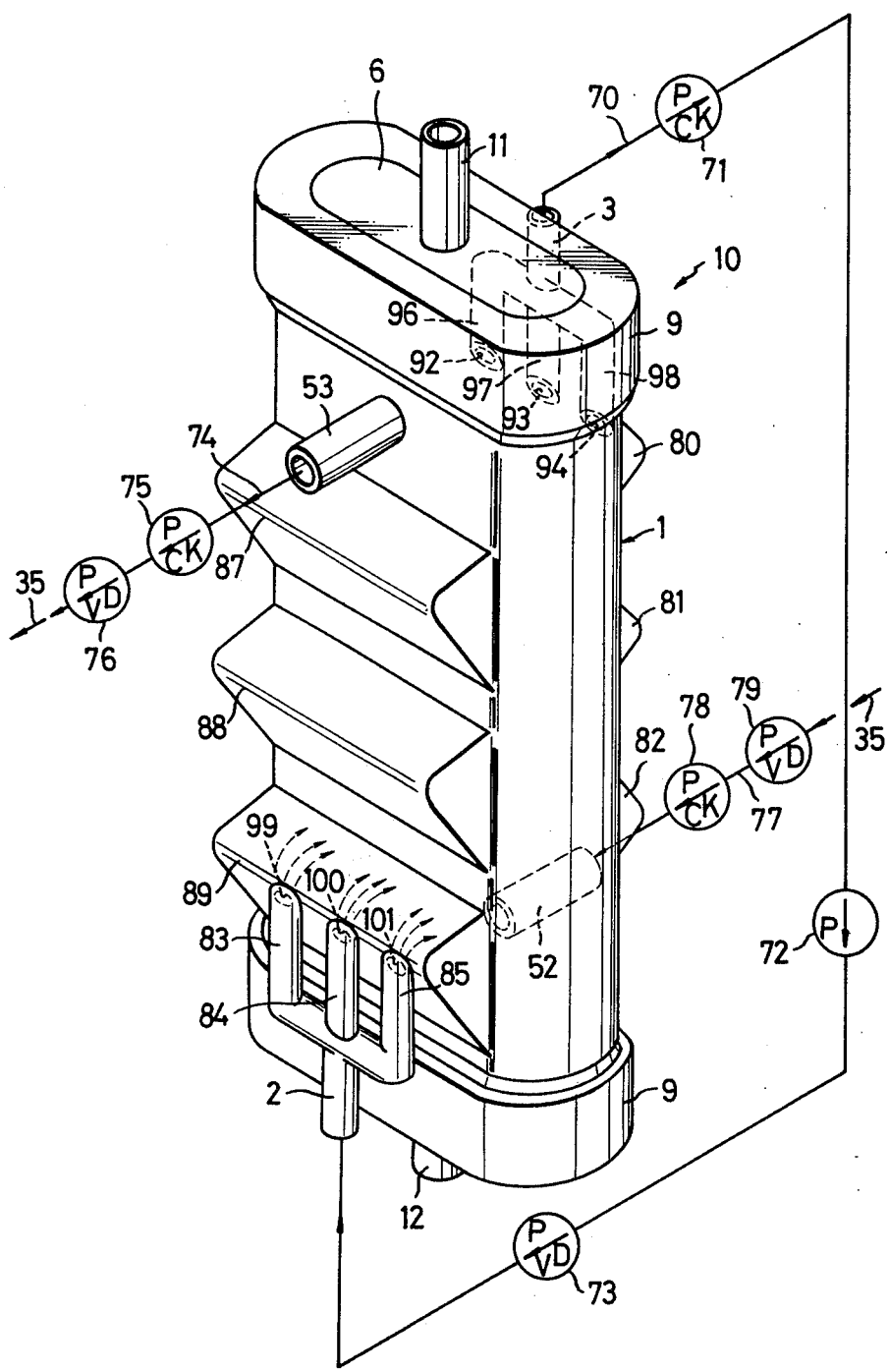
FIG. 35 is a perspective view of a modification of the blood dialysis apparatus shown in FIG. 34.

FIG. 35 shows a modification of the apparatus of FIG. 34. In this modification, the inlet and outlet portions comprises threeforked tubes 83, 84, 85 and 96, 97, 98 for recycling the dialysate. The three forked tubes are connected commonly to the inlet and outlet tubes 2 and 3. Openings 99, 100 and 101 of the inlet three forked tubes 83, 84 and 85 communicate with the enlarged cross-section portion 89 at the lower part thereof, while openings 92, 93 and 94 of the outlet three forked tubes 96, 97 and 98 communicate with the enlarged cross-section portion 80.

The dialysate coming from the inlet three forked tubes 83, 84 and 85 is spread along the curved surface of the enlarged cross-section portion 89, and distributed uniformly to the bundle 7. The dialysate is uniformly collected into the outlet three forked tubes 96, 97 and 98, and discharged through the outlet tube 3. Since the dialysate does not rush directly to the bundle 7, there is little possibility that the bundle 7 is damaged with the rush-flow of the dialysate.

Figure 36:
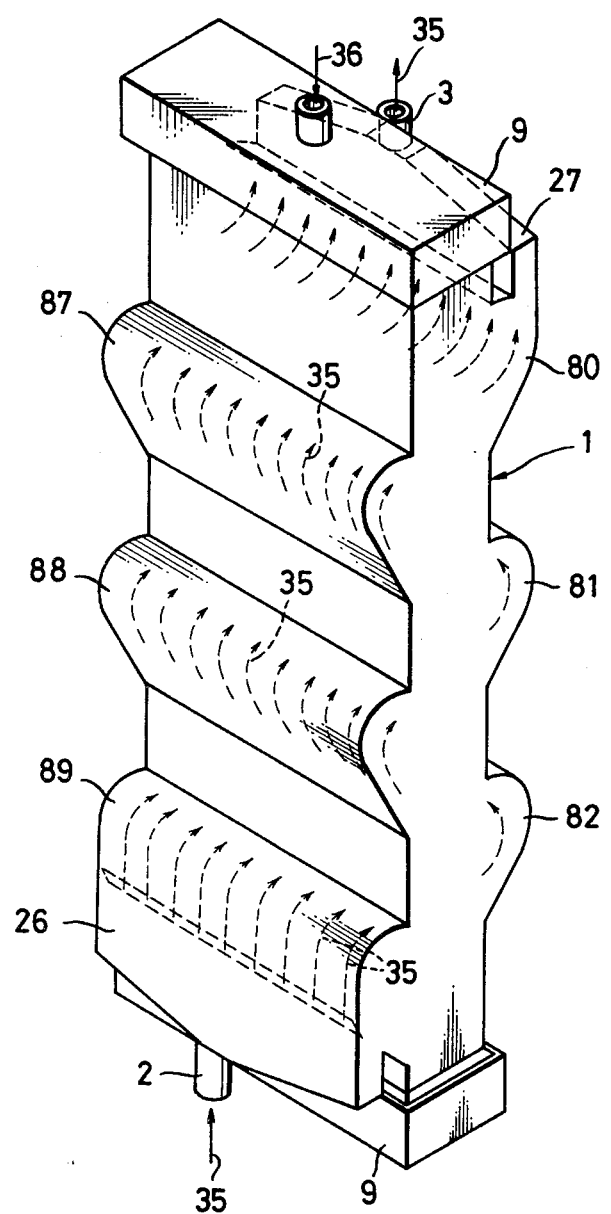
FIG. 36 is a perspective view of another modification of the apparatus of FIG. 34.

FIG. 36 shows another modification of the apparatus of FIG. 34. In this modification, the tapered inlet and outlet portions 26 and 27, which have been described in the above embodiments, are connected to the enlarged cross-section portions 89 and 80 instead of the three forked tubes 83, 84, 85 and 96, 97, 98 of FIG. 35. The same effect as in the apparatus of FIG. 35 can be obtained, as shown by the curved arrows in FIG. 36.

In the apparatus of FIG. 36, the inlet and outlet tubes 52 and 53 of FIG. 35 are omitted. The dialysate may be flowed through the slit-like openings of the inlet and outlet portions 26 and 27 in single path. Or the dialysate may be recycled through the slit-like openings of the inlet and outlet portions 26 and 27. In this case, the supply and discharge of the dialysate are effected in a part of the recycling path.

Next, a fourth embodiment of this invention will be described with reference to FIG. 37 and FIG. 38. FIG. 38 shows a modification of the apparatus of FIG. 37. Parts in FIG. 37 and FIG. 38 which correspond to each other, are denoted by the same reference numerals.

Figure 37:
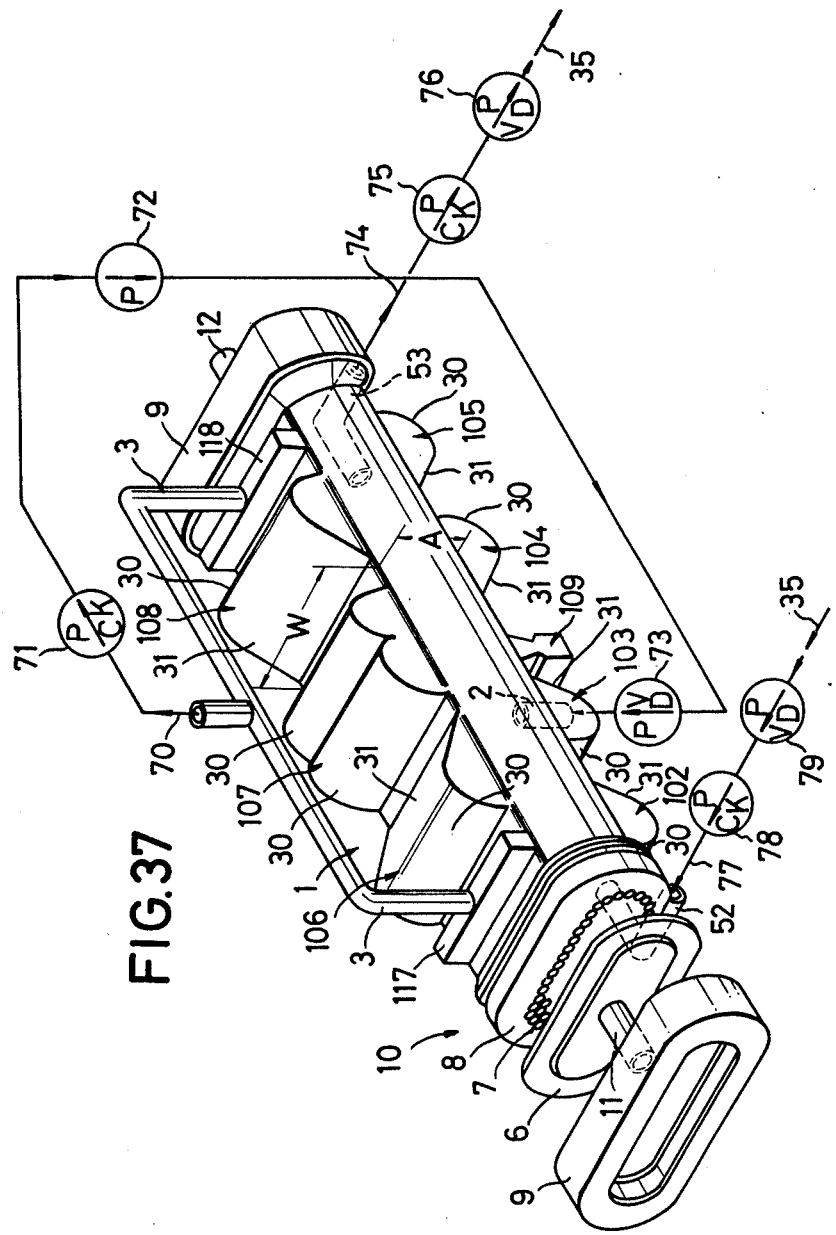
FIG. 37 is a perspective view of a blood dialysis apparatus according to a fourth embodiment of this invention, partly exploded.
Figure 38:
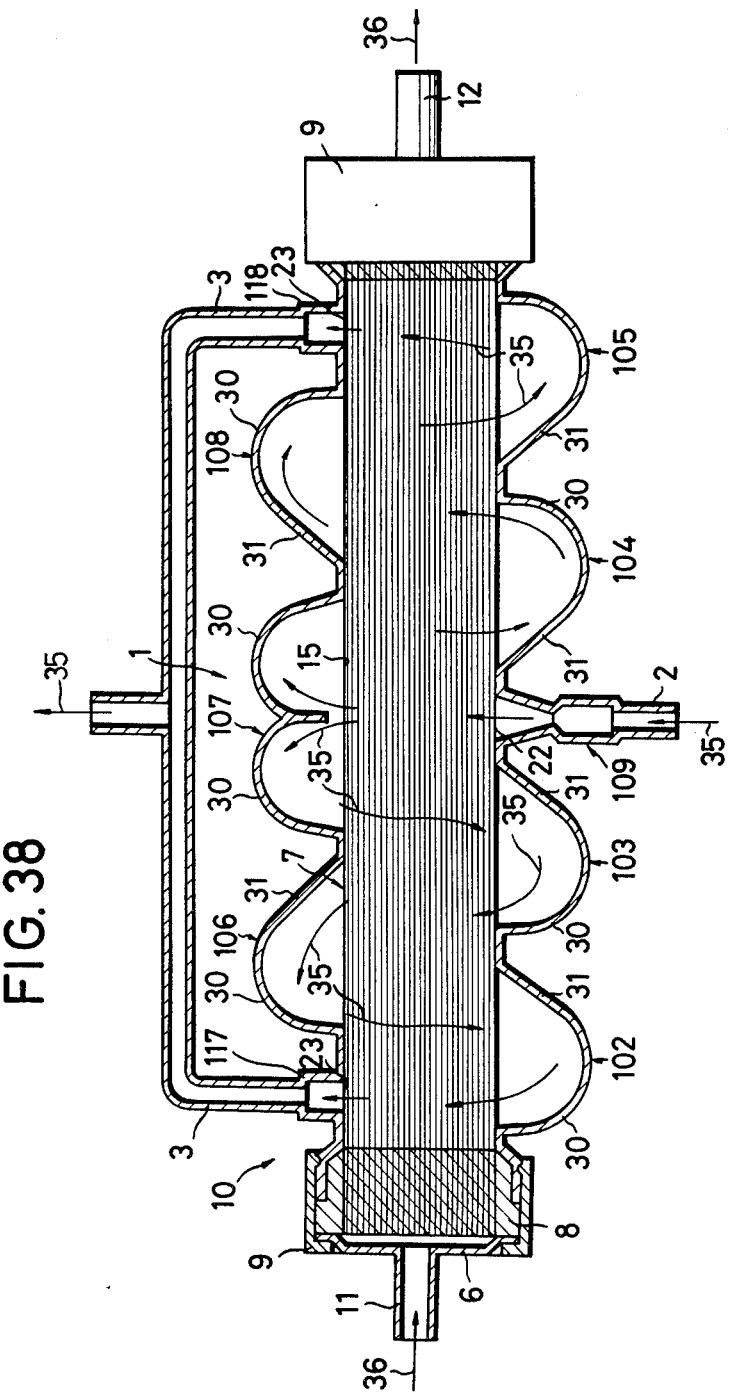
FIG. 38 is a cross-sectional view of a modification of the apparatus of FIG. 37.

In the apparatus of FIG. 37, four enlarged cross-section portions 102, 103, 104 and 105 are formed in the lower side of the housing 1, extending over the width of the lower side. And three enlarged cross-section portions 106, 107 and 108 are formed in the upper side of the housing 1, extending over the width of the upper side. An orifice portion 109 for recycling the dialysate is formed in the lower side between the enlarged cross-section portions 103 and 104, extending over the width of the lower side. The four lower enlarged cross-section portions 102 to 105 and the three upper enlarged cross-section portions 106 to 108 are displaced alternately and longitudinally relative to each other in the lower and upper sides, respectively. The enlarged cross section portions 102, 103 and 104, 105 and 106 and 108 are symmetrically placed with respect to each other. The enlarged cross-section portions 102 to 106 and 108 consist of the flat wall 31 and the round or curved wall 30. The placement are in such a way that flat-wall sides are placed nearer to the orifice portion 109. The enlarged cross-section portion 107 consists of a pair of round or curved walls 30. The center of the enlarged cross-section portion 107 faces to the inlet opening 22 of the orifice portion 109 for the dialysate 35. Outlet portions 117 and 118 having the slit-like openings 23 are formed to the left of the enlarged cross-section portion 106 and to the right of the enlarged cross-section portion 108 in the housing 1, respectively.

The inlet tube 2 for recycling the dialysate 35 is connected to the center of the orifice portion 109. The outlet tube 3 for recycling the dialysate 35 is connected to the outlet portions 117 and 118. The outlet tube 3 is bifurcated. The dialysate 35 is withdrawn from the central portion of the outlet tube 3. The outlet tube 53 for discharging the dialysate 35 is formed integrally with the enlarged cross section portion 105, opposite to the outlet portion 118. The inlet tube 52 for supplying the dialysate 35 is formed integrally with the enlarged cross-section portion 102, opposite to the outlet portion 117. The description of the other parts which correspond to the parts of FIG. 34 will be omitted.

FIG. 38 shows a cross-sectional view of a modification of the apparatus of FIG. 37. This modification is different from the apparatus of FIG. 37 only in such construction that the inlet and outlet tubes 52 and 53 for supplying and discharging the dialysate 35 are omitted.

The dialysate 35 is led into the housing 1 through the inlet opening 22. It flows across the bundle 7, and is led into the enlarged cross-section portion 107 where the dialysate 35 is divided two ways along the inner curved walls leftward and rightward. Thereafter, the dialysate 35 again flows across the bundle 7.

Since the orifice portion 109 having the slit-like opening extends over the width of the permeating region 15, the dialysate can uniformly flow through substantially the entire bundle. Moreover, the slit-like openings 23 extend over the width of the bundle 7, the dialysate can be widely and uniformly collected toward the openings 23. As already described in detail in other embodiments, useful cross flow of the dialysate is developed undulatedly left- and right-wards in the housing 1.

In the apparatus of FIG. 38, the leftward flow of the dialysate is counter current against blood 36 flow, while the right-ward flow of the dialysate is co-current to the blood flow. The distance between the inlet opening 22 and the outlet opening 23 is reduced to about half in comparison with the corresponding distance in the apparatus of FIG. 8. Thus, the cross flow can be more intensive than in the apparatus of FIG. 8. It is a big merit that the cross flow does not reduce until the outlet openings 23.

In this embodiment, the dialysate may be flowed through the inlet and outlet openings 22 and 23 in single path. Alternatively, the dialysate may be recycled through the inlet and outlet openings 22 and 23. In this case, the supply and discharge of the dialysate are effected in a part of the recycling path.

Next, a fifth embodiment of this invention will be described with reference to FIG. 39 to FIG. 41.

Figure 39:
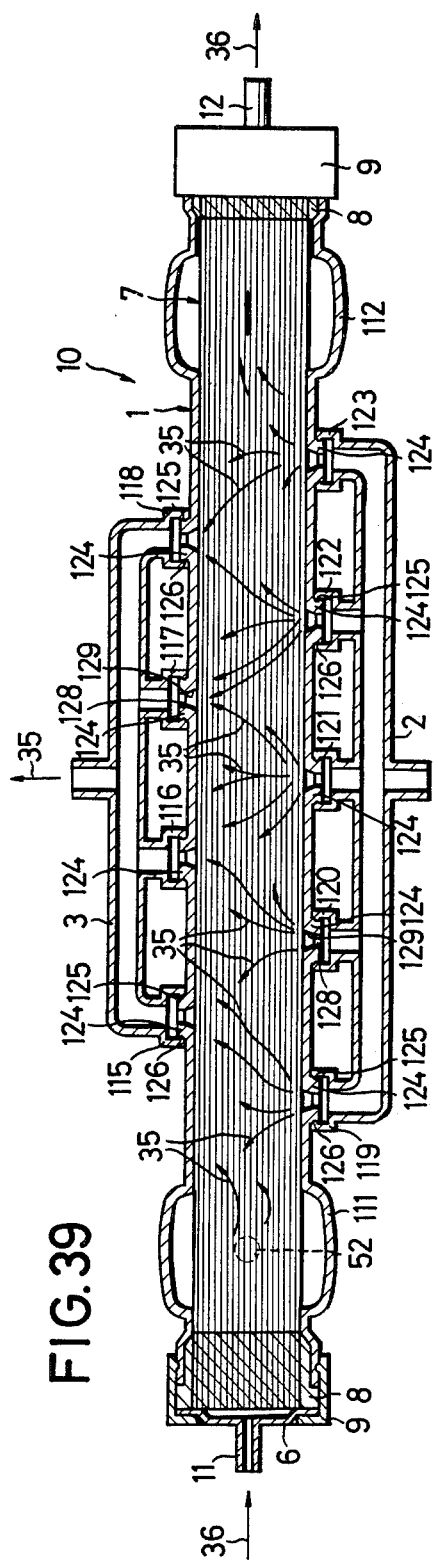
FIG. 39 is a cross-sectional view of a blood dialysis apparatus according to a fifth embodiment of this invention.

In FIG. 39, enlarged cross-section portions 111 and 112 are formed in both end portions of the housing 1. The inlet tube 52 for supplying the dialysate, and the outlet tube (not shown) for discharging the dialysate are formed integrally with the enlarged cross-section portions 111 and 112, respectively. The inlet and outlet tubes for supplying and discharging dialysate are positioned on a diagonal line in the housing 1. In the apparatus of FIG. 39, four outlet portion 115, 116 117 and 118 having the length W (see FIG. 37), for recycling the dialysate are attached to the upper wall of the housing 1 at regular intervals. The outlet tube 3 for recycling the dialysate is connected commonly to the four outlet portions 115 to 118. The dialysate from the four outlet portions 115 to 118 is joined in the outlet tube 3. Five inlet portions 119, 120, 121 122 and 123 having substantially the same length as the outlet portions 115 to 118, for recycling the dialysate are attached to the lower wall of the housing 1 at regular intervals. The inlet tube 2 for recycling the dialysate is connected commonly to the five inlet portions 119 to 123. The dialysate is distributed from the inlet tube 2 into the five inlet portions 119 to 123. The inlet portions 119 to 123 and outlet portions 115 to 118 are alternately arranged so as to generate the effective cross flow of the dialysate.

In order to assemble the inlet and outlet portions 119 to 123 and 115 to 118 to the housing 1, flange portions 124 are formed in the upper and lower sides of the housing 1, extending over the width W of the housing 1. Grooves 125 are formed in the outer surfaces of the flange portions 124. Corresponding to the grooves 125, ridges 126 are formed in the inner surfaces of the end portions of the inlet and outlet portions 119 to 123 and 115 to 118. By pushing the inlet and outlet portions onto the housing 1, the ridges 126 of the inlet and outlet portions click into the grooves 125 of the flange portions 124 of the housing 1, so that the inlet and outlet portions are attached to the housing 1. It is easy to mount and demount the inlet and outlet portions 119 to 123 and 115 to 118. They may be attached by any other means, for example, by adhesive.

Slit-like openings 128 are formed adjacent to the inlet and outlet portions 115 to 118 and 119 to 123 in the housing 1.

Adjacent to the slit-like openings 128, pairs of inclined surfaces 129 are formed so as to define orifices. By such formation, the dialysate can be uniformly led into or led out from the housing 1.

The dialysate is forced to flow across the bundle 7 from the inlet portions 119 to 123, and is collected into the outlet portions 115 to 118. Then, it is led out from the housing 1 through the outlet tube 3. With the action of the recycle pump, the dialysate can easily reach the outlet portions 115 to 118 opposite to the inlet portions 119 to 123, crossing the bundle 7. Referring to the inlet portion 120, the dialysate from the inlet portion 120 is effectively collected toward the opposite outlet portions 115 and 116. Accordingly, very smooth and intensive cross flow of the dialysate can be effected.

The inlet portions 119 to 123 and the outlet portions 115 to 118 are formed on the walls with the shorter passage of dialysate in the cross section of the flat housing 1. Accordingly, the cross flow is more intensive than in the case that the inlet portions and outlet portions are formed on the walls the longer passage of dialysate in the cross section. Since the inlet portions 119 to 123 and the outlet portions 115 to 118 are alternately displaced, the dialysate can more widely flow through the bundle 7.

Since the dialysate is introduced into the housing 1 through the inlet tube 52, the dialysate in the left half of the housing 1 is more fresh than in the right half of the housing 1. The concentration of the components of the dialysate varies with the flow of the dialysate toward the outlet tube, therefore, a preferable concentration gradient can be obtained in the housing 1 from left to right.

Figure 40:
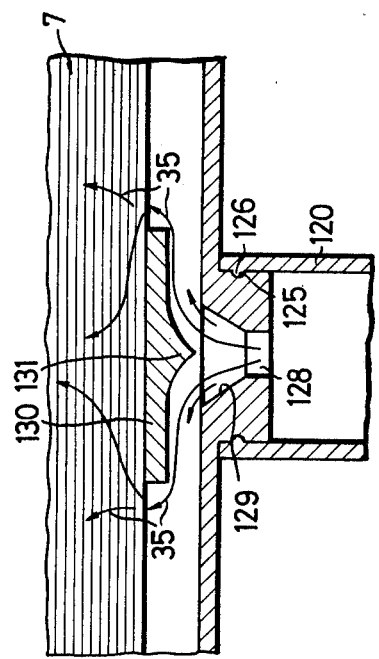
FIG. 40 is an enlarged cross-sectional view of a modification of the inlet portion for dialysate shown in FIG. 39.

FIG. 40 shows a part of a modification of the apparatus of FIG. 39. The parts in this modification which correspond to the parts in the apparatus of FIG. 39, are denoted by the same reference numerals.

In this modification, the inlet portions 119 to 123 are tubular or circular in cross section, and are arranged on the center line in the lengthwise direction of the housing 1. In FIG. 40, only the inlet portion 120 is shown for simplification. Guide plates 130 are fixed between the side walls of the housing 1, above and adjacent to the openings 128 of the inlet portions 119 to 123. Projections 131 are formed on the guide plates 130, in the lengthwise directions of the guide plates 130. The bundle 7 is mounted on the guide plates 130.

In the apparatus of FIG. 40, the dialysate from the round opening 128 of the inlet portion 120 flows toward the guide plates 130, and is divided there into two flows, leftward and rightward. Thereafter, the dialysate flows across the bundle 7. Thus, the dialysate can be more widely distributed into the bundle 7. In this modification, the projections may be not always formed on the guide plates 130.

In the apparatus of FIG. 39, another outlet portion, which is similar to the outlet portions 115 to 118, may be additionally arranged to the left side of the outlet portion 115. This outlet portion is connected directly to the recycling tube. The flow from this outlet portion joints with the flow from the outlet portions 115 to 118 at the recycling tube. On the other hand, another additional inlet portion, which is similar to the inlet portion 119 to 123, may be additionally arranged to the right side of the inlet portion 123. This inlet portion is connected directly to the recycling tube. In the above modification, when its construction is designed so that the flow-rate through the additional outlet and inlet portion is much higher than the total flow rate through other outlet and inlet portions, more effective counter flow of the dialysate to the blood flow can be obtained.

Figure 41:
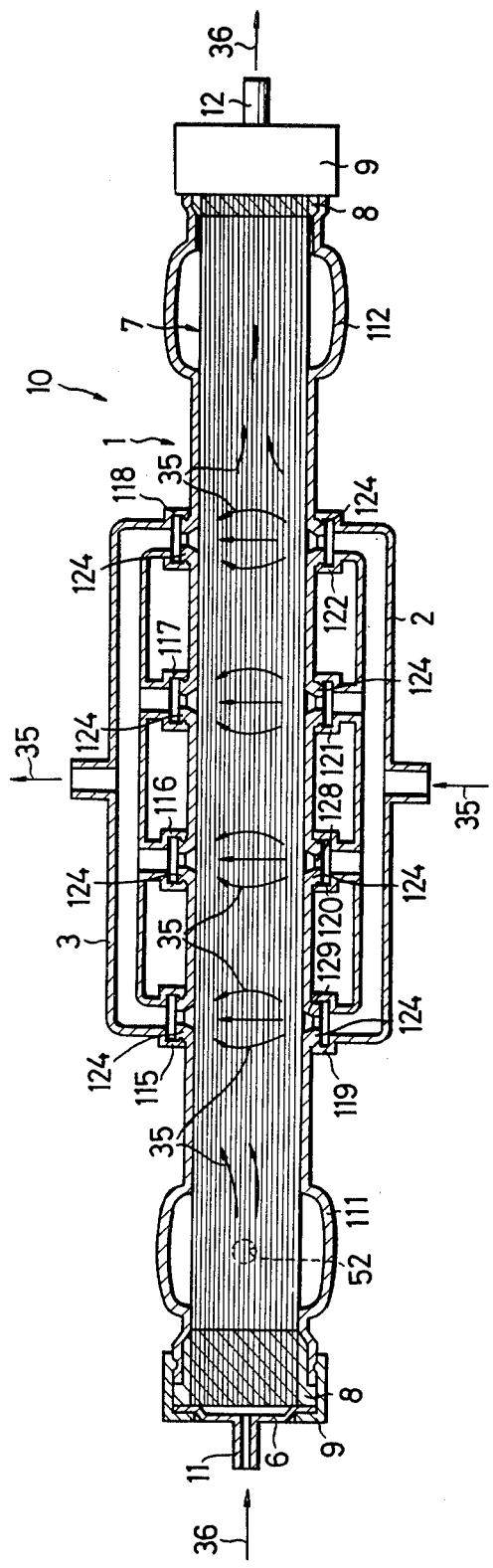
FIG. 41 is a cross-sectional view of another modification of the blood dialysis apparatus for dialysate shown in FIG. 39.

FIG. 41 shows a further modification of the apparatus of FIG. 39. In this modification, the four inlet portions 119 to 122 and four outlet portions 115 to 118 are demountably arranged on the lower and upper walls of the housing 1, directly opposite to each other. With the suction of the recycle pump, the dialysate from the inlet portions 119 to 122 flows across the bundle 7 into the corresponding outlet portions 115 to 118, as shown by the arrows in FIG. 41. The flow path is shorter, and this embodiment also develops ideal cross flow across the bundle.

While there have been described preferred embodiments of the invention, obviously further modifications and variations are possible in light of the above teachings. It is therefore to be understood that within the scope of the appended claims, the invention may be practised otherwise than as specifically described.

In the first embodiment, a plurality of the enlarged cross-section portions 39 or 49 (FIG. 1 or FIG. 7) may be arranged in a plane for one inlet portion 26 or 46 (FIG. 1 or FIG. 7). In this case, the dialysate is led into the enlarged cross-section portions 39 or 49 from the common inlet portion 26 or 46. Alternatively, a plurality of the inlet portions 26 or 46 may be arranged in a plane for one enlarged cross-section portion 39 or 49. In this case, the dialysate is led into the common enlarged cross-section portion 39 or 49 from the inlet portions 26 or 46. Moreover, the enlarged cross-section spaces 20a to 20f may be formed by rectangular walls which are alternately fixed to the inner walls of the housing 1.

In the fourth embodiment, the flow direction of the recycling dialysate may be inverted. In this case, the dialysate is led into the housing 1 from both end portions thereof, and led out from the housing 1 through the central portion thereof. The inlet portions are designed to have slit-like orifices. The left and right sides of each enlarged cross-section portion are reversed. In other words, the flat wall and curved wall are substituted for the curved wall and flat wall in each enlarged cross-section portion, respectively.

In the apparatus of FIG. 39, according to the fifth embodiment of this invention, it is preferable that the numbers of the inlet and outlet portions are at least two, respectively. And in the apparatus of FIG. 41, according to the fifth embodiment of this invention, it is preferable that the numbers of the inlet and outlet portions are at least one. More preferably, it is more than three.

The embodiments have been described as used for dialysis between two liquids. However, embodiments of the invention may be applied to the movement of material between liquid and gas, or between gas and gas through the hollow fiber membranes. Moreover, such embodiments may be used not only as a blood dialysis apparatus in an artificial kidney, but also for blood oxygen addition apparatus in an artificial lung, in which the blood flows along the inside of the hollow fibres, while the gas or the liquid containing oxygen flows along the outside of the hollow fibres. Also embodiments may be used for de-salting and purification of water by reverseosmosis, manufacturing processes for foods such as condensation of juice, removal of yeast in beer, and so on.

What is claimed is:

1. In a hollow-fiber permeability apparatus, comprising:
    a housing defining an interior including a permeating region;
    a bundle of permeable-wall hollow fibers disposed at least in said permeating region of said housing;
    a first inlet and means for causing a first fluid to flow into said first inlet and through said housing adjacent the exterior wall surfaces of said fibers;
    a first outlet for passage of said first fluid out of said housing; and
    a second inlet and means for causing a second fluid to flow into said second inlet and through said housing inside said fibers such that materials selectively permeate through the walls of said fibers;
    the improvement wherein said housing is defined by opposed longer walls and interconnecting opposed shorter walls whereby the housing has a flattened cross-section in a plane perpendicular to the longitudinal extent of said fibers, said first inlet comprising one group of at least two openings formed in one longer wall and spaced-apart in the longitudinal direction of the fibers, said first outlet comprising another group of at least two openings formed in the opposite longer wall and spaced-apart in the longitudinal direction of said fibers, the openings comprising said first inlet providing for feeding of said first fluid in a plurality of independent streams across separate portions of said bundle into the openings comprising said first outlet, each of said openings extending across said longer walls whereby the openings are substantially coextensive with the longer transverse dimension of said bundle of fibers, and wherein each of said openings comprises a slit-like opening whereby said separate portions each comprise only a small longitudinal portion of the bundle for engagement by the first fluid exiting from the openings of said first inlet.

2. An apparatus in accordance with claim 1 wherein said one group of openings in one longer wall is offset with respect to the other group of openings in the other longer wall whereby said streams tend to move angularly across said bundle.

3. An apparatus in accordance with claim 1 wherein the openings of said one group of openings in one longer wall are positioned directly opposite the openings of said other group of openings in the other longer wall whereby said streams tend to move substantially straight across said bundle.

4. An apparatus according to claim 1 wherein said one group of openings define exit ends terminating at positions spaced from the surface of said bundle, and including guide plates positioned opposite said exit ends for engaging said first fluid prior to contact of the first fluid with said bundle.

5. An apparatus in accordance with claim 4 wherein said guide plates define guide surfaces for dividing the flow of fluid from said first inlet whereby the fluid exiting from each inlet opening moves into contact with the bundle at separate locations.

6. An apparatus in accordance with claim 1 comprising a blood dialysis apparatus, said first fluid comprising a dialysate, and said second fluid comprising blood.

7. An apparatus in accordance with claim 1 wherein said slit-like openings extend to positions immediately adjacent the surface of said bundle whereby fluid exiting from the one group of openings will immediately contact the bundle and whereby fluid exiting from the bundle immediately enters the other group of openings.

* * * * *